United States Patent
Ichikawa et al.

(10) Patent No.: US 9,536,140 B2
(45) Date of Patent: *Jan. 3, 2017

(54) INFORMATION PROCESSING APPARATUS AND COMPUTER READABLE MEDIUM

(71) Applicant: CASIO COMPUTER CO., LTD., Shibuya-ku, Tokyo (JP)

(72) Inventors: Tatsuzi Ichikawa, Saitama (JP); Koji Nishitani, Tokyo (JP); Fuminori Sano, Tokyo (JP); Noriyoshi Katsumura, Saitama (JP); Kazuyasu Yamane, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,662

(22) Filed: Jan. 28, 2016

(65) Prior Publication Data

US 2016/0140388 A1 May 19, 2016

Related U.S. Application Data

(62) Division of application No. 13/938,445, filed on Jul. 10, 2013, now Pat. No. 9,285,984.

(30) Foreign Application Priority Data

Jul. 24, 2012 (JP) .................................. 2012-163526
Jul. 26, 2012 (JP) .................................. 2012-165318

(51) Int. Cl.
*G06F 3/00* (2006.01)
*G06K 9/00* (2006.01)
(Continued)

(52) U.S. Cl.
CPC .......... *G06K 9/00442* (2013.01); *G06F 3/005* (2013.01); *G06F 3/0346* (2013.01);
(Continued)

(58) Field of Classification Search
CPC ....... G06K 9/00442; G06K 9/222; G06K 9/46
See application file for complete search history.

(56) References Cited

U.S. PATENT DOCUMENTS 6,366,698 B1 4/2002 Yamakita
7,675,504 B1 3/2010 Smith et al.
(Continued)

FOREIGN PATENT DOCUMENTS

CN 101237500 8/2008
CN 101689064 3/2010
(Continued)

OTHER PUBLICATIONS

Non-Final Office Action for U.S. Appl. No. 13/938,455 dated Jul. 9, 2015.
(Continued)

*Primary Examiner* — Omar Abdul-Ali
(74) *Attorney, Agent, or Firm* — Amin, Turocy & Watson LLP

(57) ABSTRACT

An information processing apparatus includes: an image pickup unit, a recognition unit and an execution unit. The image pickup unit photographs a recording medium to generate a picked-up image. The recognition unit recognizes a handwritten mark in the picked-up image generated by the image pickup unit. The execution unit performs a predetermined process according to the handwritten mark recognized by the recognized unit.

10 Claims, 23 Drawing Sheets

(51) Int. Cl.

| | |
|---|---|
| *G06F 3/0488* | (2013.01) |
| *G06Q 10/10* | (2012.01) |
| *G06K 9/20* | (2006.01) |
| *G06F 3/0346* | (2013.01) |
| *G06K 9/22* | (2006.01) |
| *G06K 9/46* | (2006.01) |
| *G06T 11/60* | (2006.01) |
| *H04N 7/18* | (2006.01) |

(52) U.S. Cl.
CPC ....... *G06F 3/04883* (2013.01); *G06K 9/2054* (2013.01); *G06K 9/222* (2013.01); *G06K 9/46* (2013.01); *G06Q 10/10* (2013.01); *G06T 11/60* (2013.01); *H04N 7/18* (2013.01); *G06K 2009/4666* (2013.01); *G06K 2209/01* (2013.01)

(56) References Cited

U.S. PATENT DOCUMENTS

| | | |
|---|---|---|
| 8,102,383 B2 | 1/2012 | Cohen et al. |
| 2004/0098306 A1 | 5/2004 | Fitzpatrick et al. |
| 2007/0076984 A1 | 4/2007 | Takahashi et al. |
| 2008/0144131 A1 | 6/2008 | Jung et al. |
| 2008/0279454 A1 | 11/2008 | Lev et al. |
| 2010/0194976 A1 | 8/2010 | Smith et al. |
| 2011/0188093 A1 | 8/2011 | Campbell et al. |

FOREIGN PATENT DOCUMENTS

| | | |
|---|---|---|
| JP | 03-088475 | 4/1991 |
| JP | 08-242326 | 9/1996 |
| JP | 10-260916 | 9/1998 |
| JP | 2004-192118 | 7/2004 |
| JP | 2006-301695 | 11/2006 |
| JP | 2009-276900 | 11/2009 |
| JP | 2010-176603 | 8/2010 |
| JP | 2010-244210 | 10/2010 |
| JP | 2011-076267 | 4/2011 |
| JP | 2012-015657 | 1/2012 |

OTHER PUBLICATIONS

Office Action of Notification of Reason(s) for Refusal for Japanese Patent Application No. 2012-163526 dated Apr. 28, 2015, 9 pages.
Nikkei Business Publications., Inc. "Great Use of Smartphone and Scanner, Useful for Work, Secret Techniques of Digitalization of All Notes & Documents", Nikkei Personal Computing, Japan, Dec. 12, 2011, No. 639, pp. 50-53.
Shinyusha Co., Ltd. "Use Smartphone 100% with PC!!, School for Utilization of Smartphone to Make Smartphone 100 times more Interesting in View of Win100, [Third Period], Windows100%,", Japan, Jan. 13, 2012, vol. 15, No. 2, pp. 66-67.
Office Action of Notification of Reasons for Refusal for Japanese Patent Application No. 2012-165318 dated Jul. 21, 2015, 10 pages.
Chinese Office Action for Chinese Patent Application No. 201310314495.0 mailed on Jan. 29, 2016.
Japanese Office Action for Japanese Patent Application No. 2012-165318 mailed on Mar. 15, 2016.

FIG. 4

| MARK | CATEGORY |
|---|---|
| ! | IDEA |
| ✓ | DECIDED MATTER |
| 🕒 | THING TO DO |
| ⋮ | ⋮ |

| MARK | COMMAND |
|---|---|
| ▢▢ | AUTOMATIC SUBMISSION |
| △ | CLIPPING |
| ⋮ | ⋮ |

| MARK | DESTINATION ADDRESS |
|---|---|
| v1 | ······ MR. A |
| v2 | ······ MR.B |
| v3 | ······ MR.C |

FIG. 23

| ID | EVENT NAME | DATE AND TIME | | ATTENDEE | MAIL ADDRESS |
|---|---|---|---|---|---|
| | | START | END | | |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |

Regarding the discussion on ○○(month) × ×(date),···

· · · · · · · · · · · · · · · · ·
· · · · · · · · · · · · · · · · ·
· · · · · · · · · · · · · · · · ·
· · · · · · · · · · · · · · · · ·

Taro Tokkyo v2

Mr. □□□

The document requested the other day has been finished.

Hanako Isho

INFORMATION PROCESSING APPARATUS AND COMPUTER READABLE MEDIUM

CROSS REFERENCE TO RELATED APPLICATION

This application is a Division of application Ser. No. 13/938,455 filed on Jul. 10, 2013, the entire contents of which are incorporated herein by reference.

This application is based upon and claims the benefit of priority under 35 USC 119 of Japanese Patent Applications No. 2012-163526 filed on Jul. 24, 2012 and No. 2012-165318 filed on Jul. 26, 2012, the entire disclosure of which, including the descriptions, claims, drawings, and abstracts, is incorporated herein by reference in its entirety.

BACKGROUND OF THE INVENTION

1. Field of the Invention

The present invention relates to an information processing apparatus and a computer readable medium.

2. Background Art

These days, at a meeting or a presentation, explanation is often made with a material displayed on a PC (Personal Computer) or a tablet-type terminal. In such a situation, an attendee takes a note on a notebook, for example, about the point of the explanation or his/her comments on the explanation while seeing the displayed material.

Later, the attendee may forget which note he/she took while which page of the material he/she was seeing. Then, there has been proposed, for example, in Japanese Patent Application Laid-Open Publication No. 2010-176603, a meeting material search support apparatus to, in response to a slide of a material being switched to another thereof displayed at a meeting, extract a difference between a picked-up image of a note picked up at a display starting time of the slide and a picked-up image of the note picked up at the display switching time of the slide to another, generate deference information including region image data of the difference and the picked-up image picked up at the display switching time and correlate and register a slide ID with the difference information.

By the way, in accordance with digitalization of paper documents, a note has been not only stored on a notebook but also as image data by being photographed. Such a case has increased. However, if the contents of a note recorded on a notebook are stored as image data as they are, it is difficult to understand the contents and to find what is written where, when seeing the photographed note later.

Further, if an attendee thinks of sharing the contents of a note with members of his/her group while taking the note, the attendee needs to perform a complex operation such as uploading the picked-up image of the note onto a common storage after the note is photographed. In addition, the attendee may forget to perform the operation itself.

SUMMARY OF THE INVENTION

Objects of the present invention include effectively using the contents recorded on a recording medium.

According to a first aspect of the present invention, there is provided an information processing apparatus including: an image pickup unit which photographs a recording medium to generate a picked-up image; a recognition unit which recognizes a handwritten mark in the picked-up image generated by the image pickup unit; and an execution unit which performs a predetermined process according to the handwritten mark recognized by the recognition unit.

According to a second aspect of the present invention, there is provided a non-transitory computer readable medium in which a program to make a computer perform a procedure is stored, the procedure including: photographing a recording medium to generate a picked-up image; recognizing a handwritten mark in the generated picked-up image; and performing a predetermined process according to the recognized handwritten mark.

According to a third aspect of the present invention, there is provided an information processing apparatus including: an image pickup unit which photographs a recording medium to generate a picked-up image; a recognition unit which recognizes identification information existing in an area of the picked-up image generated by the image pickup unit; and a mailing unit which sends a mail including the generated picked-up image to a destination corresponding to an instruction content of the identification information recognized by the recognition unit.

According to a fourth aspect of the present invention, there is provided a non-transitory computer readable medium in which a program to make a computer perform a procedure is stored, the procedure including: photographing a recording medium to generate a picked-up image; recognizing identification information existing in an area of the generated picked-up image; and sending a mail including the generated picked-up image to a destination corresponding to an instruction content of the recognized identification information.

BRIEF DESCRIPTION OF THE DRAWINGS

FIG. 4 shows an example of the data structure of a categorization-use mark correspondence table.

FIG. 5 shows an example of the data structure of a command mark correspondence table.

FIGS. 20A and 20B each show an example of a handwritten note with a "Mailing" mark, wherein FIG. 20A shows an example of a handwritten note including a handwritten "Mailing" mark in the shape of "V" in a rectangle recorded on a recording medium, and FIG. 20S shows an example of a handwritten note recorded on a recording medium on which a two-dimensional barcode "Mailing" mark is printed.

FIG. 21 shows a correspondence between kinds of the "Mailing" mark and destination addresses registered in advance through a mail program.

FIGS. 22A and 22B each show a scheduler display screen, wherein FIG. 22A shows a calendar display 411, and FIG. 22B shows an event (schedule) display 412.

FIG. 23 shows the data structure stored in a storage unit functioning as a second storage unit in a scheduler.

FIG. 24 is an illustration for explaining region specifications for the "Mailing" mark.

DETAILED DESCRIPTION OF THE PREFERRED EMBODIMENTS

[First Embodiment]

First, an information processing apparatus in accordance with a first embodiment of the present invention is described with reference to FIGS. 1 to 16. Note that the present invention is not limited to the illustrated embodiments described hereinafter.

Figure 1:
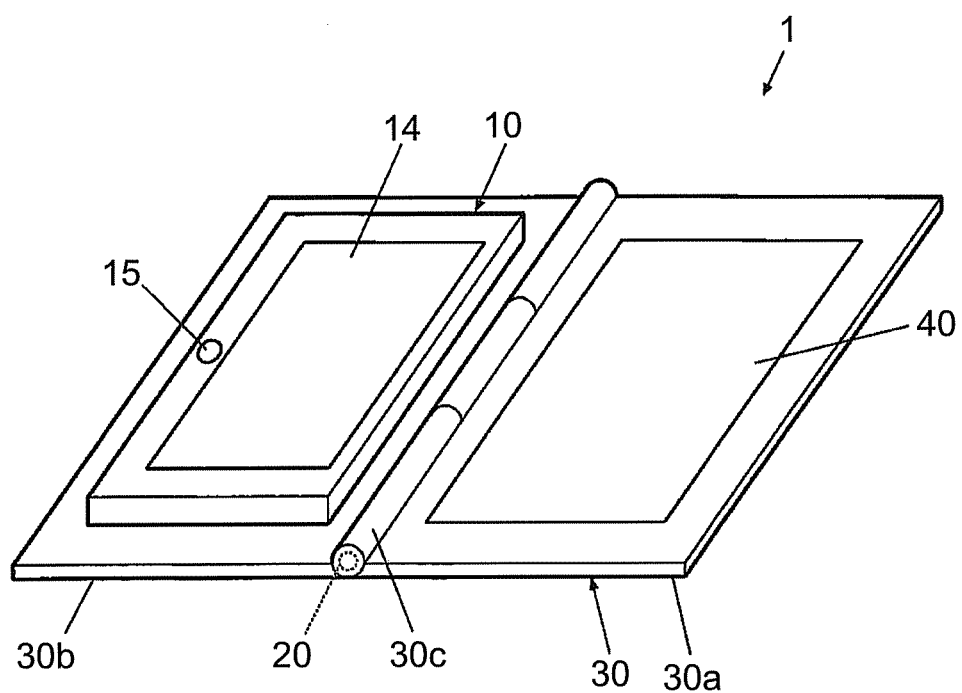
FIG. 1 is a perspective view showing the external appearance of an information processing apparatus in accordance with a first embodiment of the present invention.

FIG. 1 is a perspective view showing the external appearance of an information processing apparatus 1 in accordance with the first embodiment. The information processing apparatus 1 is a tablet-type terminal apparatus and includes a body unit 10 and a binder 30 as a case.

The body unit 10 includes a touch display unit 14 for screen display and touch input and an image pickup unit 15 as an image pickup unit.

The binder 30 includes a first cover 30a as a first case and a second cover 30b as a second case. The first cover 30a and the second cover 30b are connected to each other through a hinge part 30c as a rotating shaft so that the binder 30 is closeable (or openable). In other words, the first cover 30a and the second cover 30b can be close to (or away from) each other in a state in which the first cover 30a and the second cover 30b are connected to each other through the hinge part 30c.

On the first cover 30a, a recording medium 40 is disposed, and the second cover 30b is provided with the body unit 10. Each of the body unit 10 and the recording medium 40 is attached to the binder 30 through a latch, a hook or the like in such a way as to be detachable therefrom.

In the embodiment, the recording medium 40 is a medium where information to be photographed is recorded, namely, a subject where information is recorded. Examples of the recording medium 40 include electronic paper which can electronically display information.

The first cover 30a and the second cover 30b are each in the shape of a rectangular flat plate, and the binder 30 is closeable/openable through the hinge part 30c as if a book or a notebook is opened/closed. FIG. 1 shows a state in which the first cover 30a and the second cover 30b form an angle of 180° (open state). In this state, a user refers to a screen displayed on the touch display unit 14, performs touch input thereon and writes down characters, figures and the like on the recording medium 40.

The hinge part 30c is provided with an open-close angle sensor 20 to detect an angle formed by the first cover 30a and the second cover 30b. The open-close angle sensor 20 is constituted of a rotary encoder to detect rotation of the rotating shaft of the hinge part 30c or a magnetic sensor to detect an open-close state of the binder 30 by using a hall element or the like.

The recording medium 40 is a notebook or a writing pad which a user uses to take a note, paper on which a material (document) is printed, a book or the like. As long as the recording medium 40 is a recording medium on which information to be photographed is recorded, the raw material (type) of the recording medium 40 is not limited to paper. The recording medium 40 may be one sheet of paper or a plurality of sheets (pages) bound in a form of a book.

Figure 2:
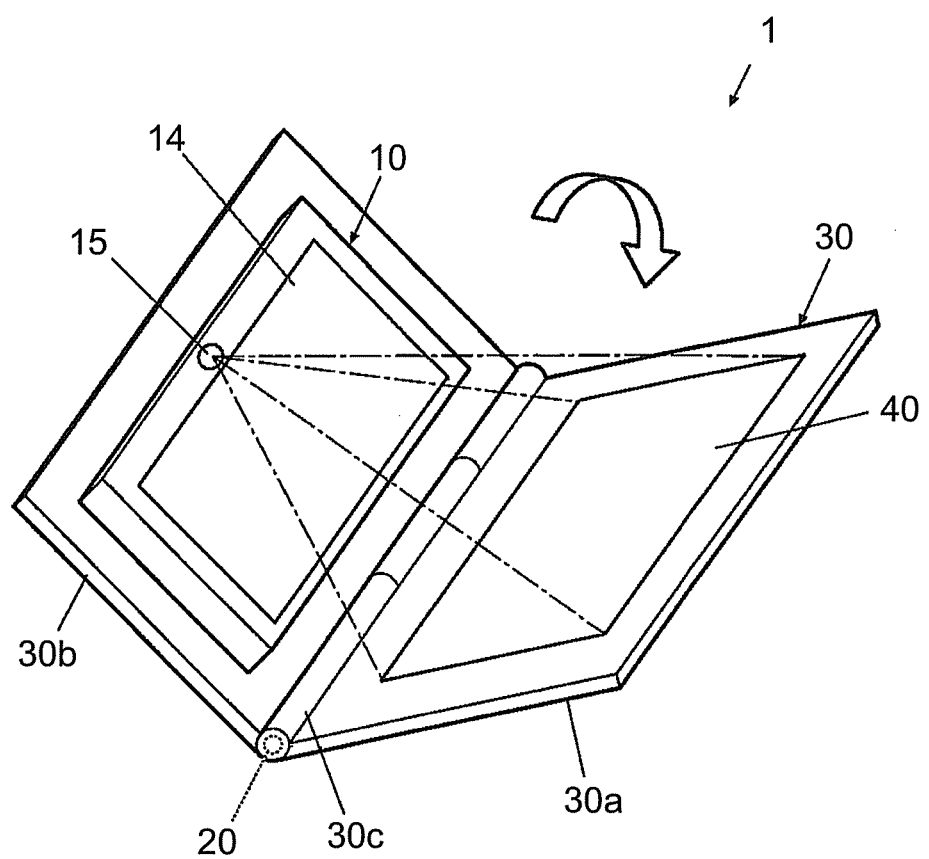
FIG. 2 shows a state in which a binder (case) including a first cover (first case) and a second cover (second case) is being closed.

FIG. 2 shows a state in which the binder 30 including the first cover 30a and the second cover 30b is being closed. The image pickup unit 15 is disposed at a point of the body unit 10 so as to face the first cover 30a. When the first cover 30a and the second cover 30b form a predetermined angle (for example, 70°), the image pickup unit 15 photographs the recording medium 40. The predetermined angle is preset to an optimum angle for photographing the recording medium 40 (optimum angle for photography), and photography conditions of a focus, an exposure and the like are set to be suitable for the angle. While a user is closing the binder 30 (making an angle formed by the first cover 30a and the second cover 30b 0°), the angle formed by the first cover 30a and the second angle 30b passes through the predetermined angle. Hence, a user can photograph the recording medium 40 without noticing it.

Figure 3:
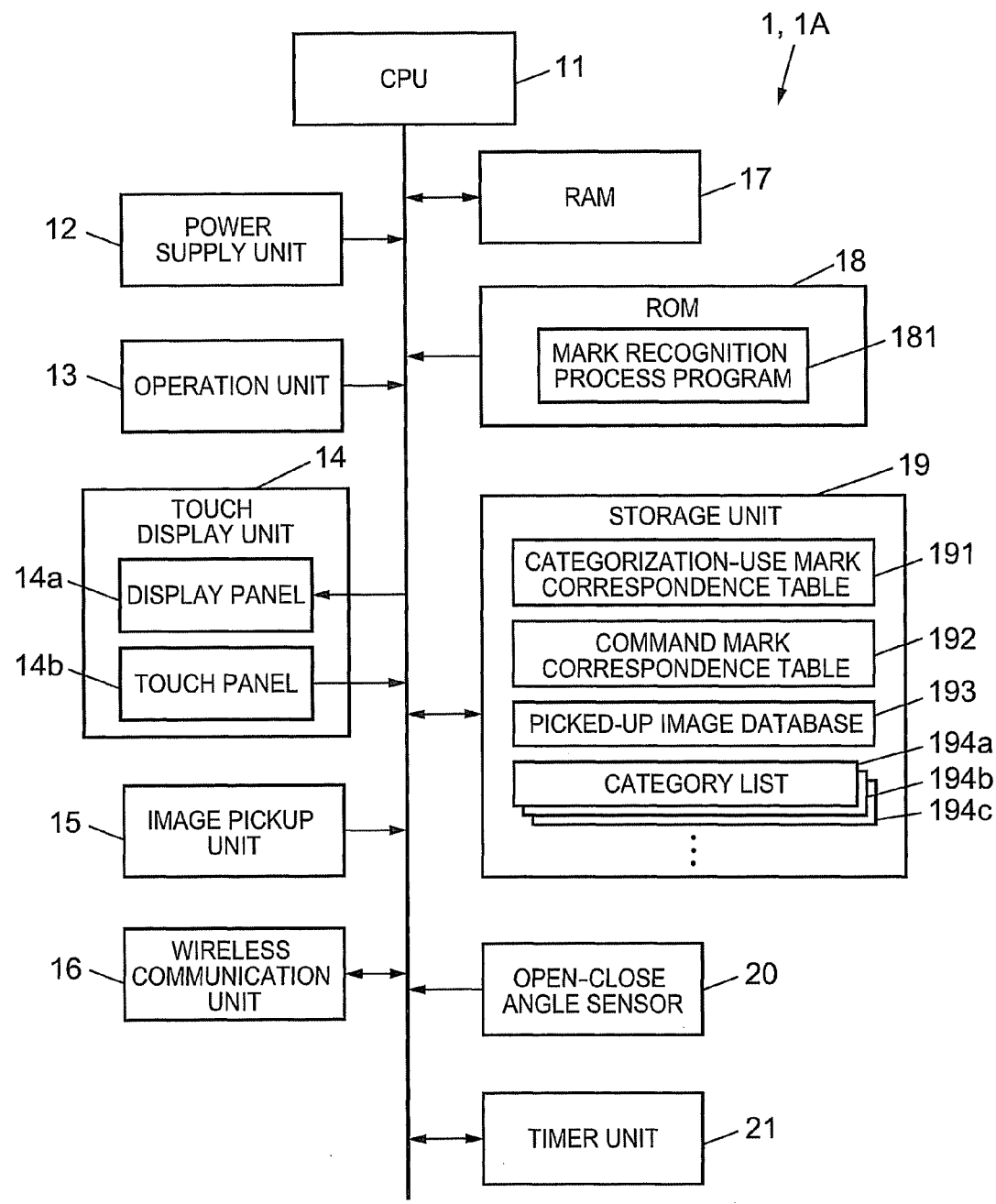
FIG. 3 is a block diagram showing the functional configuration of the information processing apparatus.

FIG. 3 is a block diagram showing the functional configuration of the information processing apparatus 1.

The information processing apparatus 1 includes: a CPU (Central Processing Unit) 11 as a recognition unit, an execution unit, a detection unit, a photography control unit, a management unit, a cut-out unit, a storage control unit, a display control unit, a reading unit, a command execution unit and a sending control unit; a power supply unit 12; an operation unit 13; the touch display unit 14; the image pickup unit 15; a wireless communication unit 16; a RAM (Random Access Memory) 17; a ROM (Read Only Memory) 18; a storage unit 19; the open-close angle sensor 20; and a timer unit 21.

The CPU 11 integrally controls process operations of the units and the like (components) of the information processing apparatus 1 in response to operation signals inputted from the operation unit 13 or the touch display unit 14 or instruction signals received by the wireless communication unit 16. More specifically, the CPU 11 reads various process programs stored in the ROM 18 to open the programs in the RAM 17 and performs various processes in coordination with the programs.

The power supply unit 12 supplies power to the components of the information processing apparatus 1.

The operation unit 13 includes operation keys such as a power key to turn on/off power and outputs operation signals corresponding to the operation keys to the CPU 11.

The touch display unit 14 is constituted of a touch panel 14b disposed on a display panel 14a as a display unit. The display panel 14a is constituted of an LCD (Liquid Crystal Display) or the like and performs screen display in response to display control signals outputted from the CPU 11. The touch panel 14b detects positions of touch operations made by a figure of a user or the like and outputs operation signals corresponding to the positions to the CPU 11. The touch panel 14b receives operation instructions from a user.

The image pickup unit 15 is a digital camera including an optical lens, an image pickup element and various sensors and photographs a subject. The image pickup unit 15 photographs the recording medium 40 to generate a picked-up image (or images).

The wireless communication unit 16 is a wireless communication module to perform data communication by being connected to the Internet via a wireless LAN (Local Area Network) router.

The RAM 17 is a volatile memory. In the RAM 17, various programs executed by the CPU 11, data related to the programs and the like are temporarily stored.

The ROM 18 is a read-only semiconductor memory where various programs and various data are stored. In the ROM 18, a mark recognition process program 181 and the like are stored.

The storage unit 19 is constituted of an HDD (Hard Disk Drive), a nonvolatile memory or the like. In the storage unit 19, information is stored in such a way as to be readable and writable. More specifically, in the storage unit 19, a categorization-use mark correspondence table 191, a command mark correspondence table 192, a picked-up image database 193, category lists 194a, 194b, 194c, . . . and the like are stored.

Figure 5:
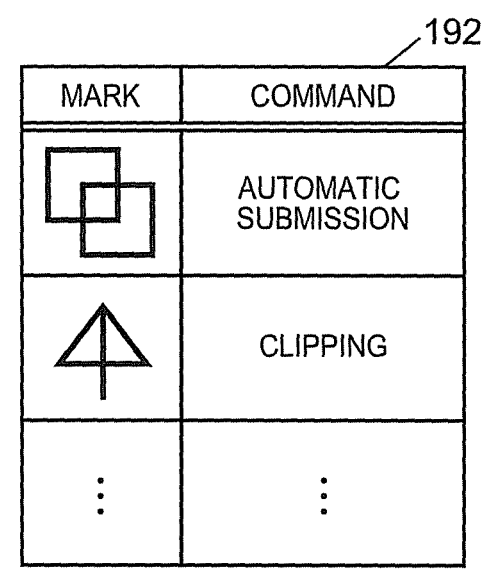

FIG. 4 shows an example of the data structure of the categorization-use mark correspondence table 191. FIG. 5 shows an example of the data structure of the command mark correspondence table 192.

In the categorization-use mark correspondence table 191, with respect to each of types of handwritten marks ("marks" hereinafter) prepared in advance for categorizing handwritten marks, an image pattern (template) corresponding to the mark (type) and a category which are correlated with each other are stored.

In the command mark correspondence table 192, with respect to each of types of handwritten marks ("marks" hereinafter) prepared in advance as command marks, an image pattern (template) corresponding to the mark and a command indicated by the mark (type) which are correlated with each other are stored.

It is preferable that these marks have shapes with which the marks can be distinguished from other marks or characters so as to be easily recognized.

Figure 6:
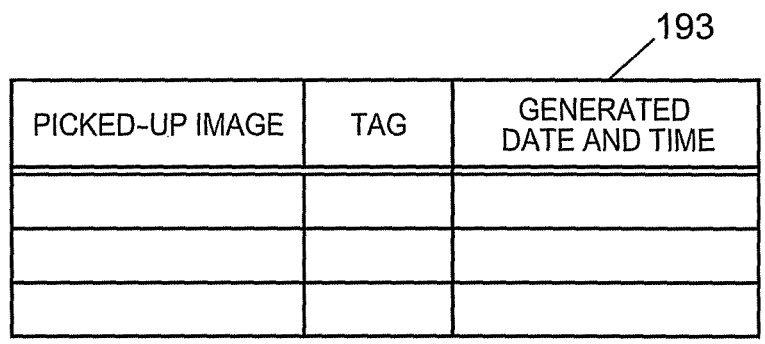
FIG. 6 shows an example of the data structure of a picked-up image database.

FIG. 6 shows an example of the data structure of the picked-up image database 193. In the picked-up image database 193, with respect to each of picked-up images generated by the recording medium 40 being photographed, image data of the picked-up image, a tag (or tags) attached to the picked-up image and a generated date and time which are correlated with each other are stored. The image data of a picked-up image is generated in a data form such as JPEG or TIFF.

Figure 7:
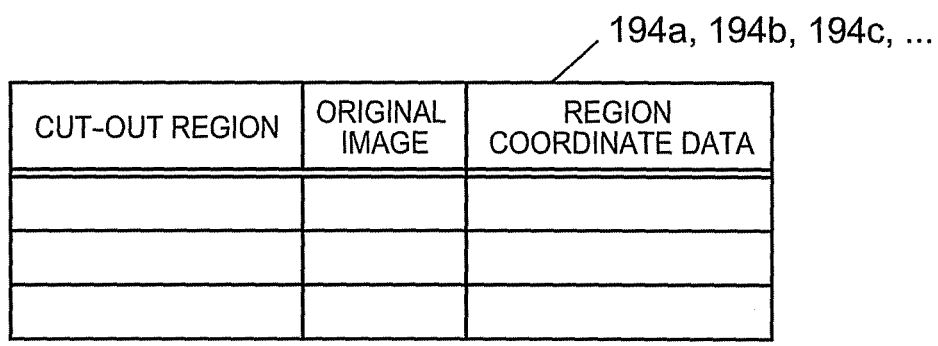
FIG. 7 shows an example of the data structure of a category list.

FIG. 7 shows the data structure of the category list 194a, 194b, 194c or . . . .

In the category list 194a, image data of cut-out regions cut out from picked-up images on which an "Idea" mark (see FIG. 4) is recorded, information (file names, storage locations and the like) on their respective original images (picked-up images) from which the cut-out regions are cut out and coordinate data of the cut-out regions in their respective picked-up images which are correlated with each other are stored.

In the category list 194b, image data of cut-out regions cut out from picked-up images on which an "Decided Matter" mark (see FIG. 4) is recorded, information (file names, storage locations and the like) on their respective original images (picked-up images) from which the cut-out regions are cut out and coordinate data of the cut-out regions in their respective picked-up images which are correlated with each other are stored.

In the category list 194c, image data of cut-out regions cut out from picked-up images on which an "Thing to Do" mark (see FIG. 4) is recorded, information (file names, storage locations and the like) on their respective original images (picked-up images) from which the cut-out regions are cut out and coordinate data of the cut-out regions in their respective picked-up images which are correlated with each other are stored.

That is, the category lists 194a, 194b, 194c, . . . are prepared for the number of categorization-use marks (types).

In addition, in the storage unit 19, information on a common storage being correlated with an "Automatic Submission" mark (see FIG. 5) is stored in advance. The common storage is a destination for picked-up images in an automatic submission process (see FIG. 14). Also, in the storage unit 19, information on a common storage being correlated with a "Clipping" mark (see FIG. 5) is stored in advance. The common storage is a destination for cut-out regions in a clipping process (see FIG. 15). The common storages are each a data storage apparatus which can perform data communication with the information processing apparatus 1 by being connected to a communication network and allows registered members of the common storage to see data stored therein. The destinations (common storages) are each specified by a path, a mail address or the like. With respect to each command mark, a plurality of destinations may be set.

The open-close angle sensor 20 detects an angle formed by the first cover 30a and the second cover 30b and outputs the detected angle to the CPU 11.

The timer unit 21 includes a timer circuit (RTC; Real Time Clock) to measure a current date and time and outputs the measured current date and time to the CPU 11.

The CPU 11 detects that the binder 30 is closed to a predetermined state on the basis of the angle outputted from the open-close angle sensor 20.

The CPU 11 makes the image pickup unit 15 photograph the recording medium 40 at the timing when detecting that the binder 30 is closed to a predetermined state.

The CPU 11 searches the whole area of a picked-up image generated by the image pickup unit 15 for predetermined marks recorded thereon. More specifically, the CPU 11 performs an optical mark recognition (OMR) process on image data of the picked-up image to detect predetermined marks recorded on the recording medium 40.

For that, first, the CPU 11 performs a binarization process and a noise removal process on a picked-up image.

Then, the CPU 11 reads, with respect to each of the marks, a template corresponding to a mark from the categorization-use mark correspondence table 191 or the command mark correspondence table 192 stored in the storage unit 19 and scans the picked-up image to determine whether or not the picked-up image has a region matching the template.

Comparison between a mark and a template is performed with a certain tolerable range. A template may be enlarged, reduced, rotated or the like.

The CPU 11 performs a predetermined process in accordance with the mark recognized by searching the whole area of the picked-up image.

If a recognized mark is a categorization-use mark, the CPU 11 cuts out a region relevant to the recognized mark from the picked-up image, categorizes the cut-out region on the basis of the type of the mark and stores the cut-out region in the category list 194*a*, 194*b*, 194*c* or . . . .

The CPU 11 lists cut-out regions mark by mark (type by type) and displays each list on the display panel 14*a*.

If a recognized mark is a command mark, the CPU 11 reads a command correlated with the recognized mark from the command mark correspondence table 192 stored in the storage unit 19 and performs the read command on the picked-up image.

If a recognized mark is the "Automatic Submission" mark, which is a command mark, the CPU 11 makes the wireless communication unit 16 send the picked-up image to a predetermined command storage.

If a recognized mark is the "Clipping" mark, which is a command mark, the CPU 11 cuts out a region enclosed by a line from the picked-up image, the region corresponding to a region enclosed by a line recorded on the recording medium 40, and makes the wireless communication unit 16 send the cut-out region to a predetermined command storage.

The CPU 11 attaches a tag (or tags) indicating the type of a mark recognized in a picked-up image to the picked-up image. The CPU 11 manages picked-up images tag by tag.

Next, operations of the information processing apparatus 1 are described.

Figure 8:
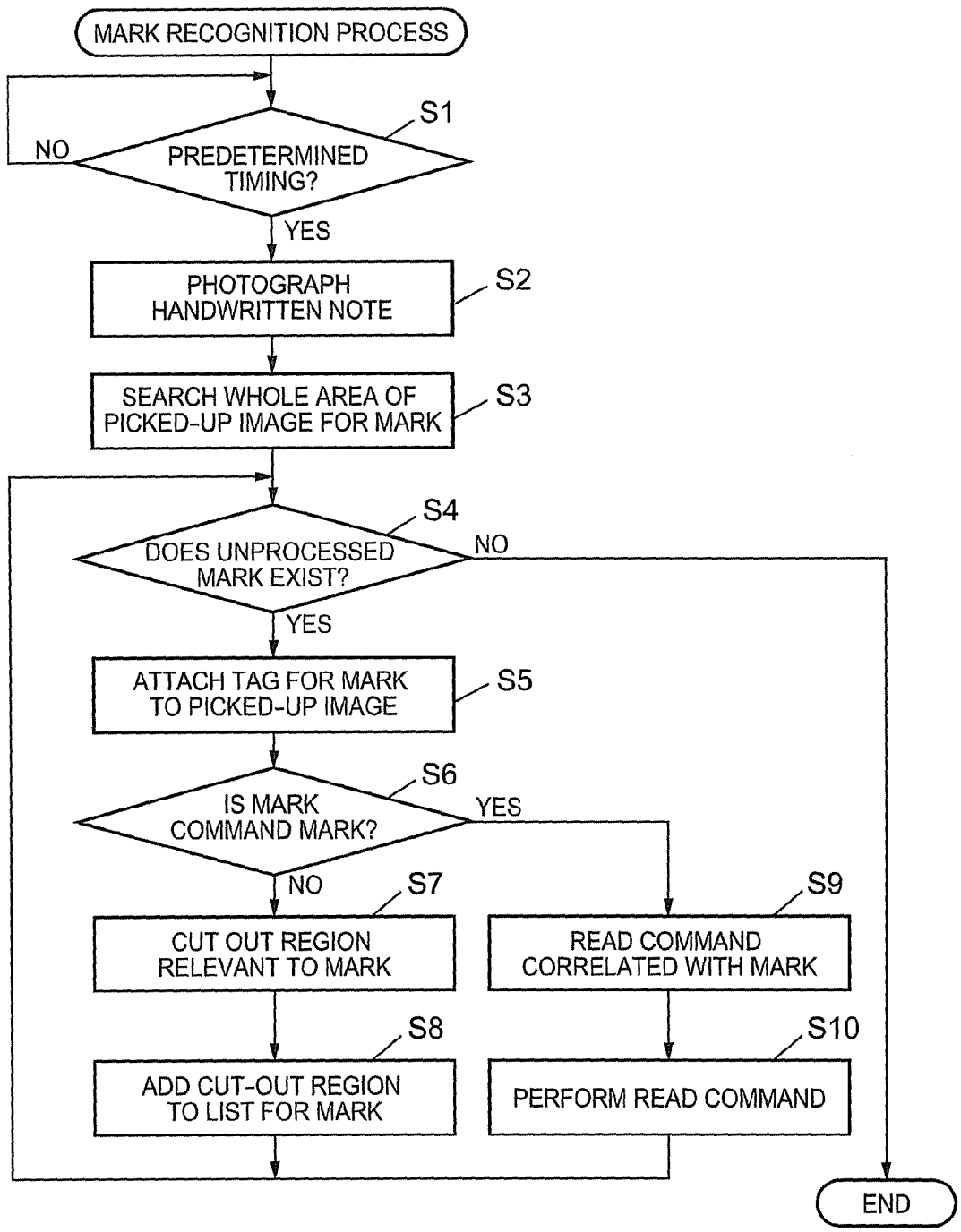
FIG. 8 is a flowchart of a mark recognition process.

FIG. 8 is a flowchart of a mark recognition process performed by the information processing apparatus 1.

This process is realized by a software process performed by the CPU 11 working in coordination with the mark recognition program 181 stored in the ROM 18.

First, the CPU 11 determines whether or not it is a predetermined timing (Step S1).

In the first embodiment, the CPU 11 determines whether or not the open-close angle is equal to or less than a predetermined angle (70°, for example) on the basis of an angle which is formed by the first cover 30*a* and the second cover 30*b* and outputted from the open-close angle sensor 20. That is, the CPU 11 determines whether or not the binder 30 including the first cover 30*a* and the second cover 30*b* is closed to a predetermined state. When determining that it is not a predetermined timing (Step S1; NO), the CPU 11 repeats Step S1.

On the other hand, when determining that it is a predetermined timing (Step S1; YES), namely, the binder 30 is closed to a predetermined state, the CPU 11 controls the image pickup unit 15 so that a handwritten note recorded on the recording medium 40 is photographed and obtains a picked-up image generated by the image pickup unit 15 (Step S2).

For example, the CPU 11 extracts the region of the recording medium 40 from the picked-up image and performs, for example, a process to correct trapezoidal (keystone) distortion on the extracted region.

In addition, the CPU 11 stores image data of the picked-up image in the picked-up image database 193 stored in the storage unit 19. Also, the CPU 11 obtains a current date and time from the timer unit 21, correlates and stores the obtained current date and time as a generated date and time with the image data of the picked-up image in the picked-up image database 193.

Next, the CPU 11 analyzes the image data of the picked-up image and searches the whole area of the picked-up image for predetermined marks recorded therein (Step S3).

More specifically, the CPU 11 refers to the categorization-use mark correspondence table 191 and the command mark correspondence table 192, which are stored in the storage unit 19, to recognize the marks in the picked-up image.

Next, the CPU 11 determines whether or not an unprocessed mark exists (Step S4).

When determining that an unprocessed mark exists (Step S4; YES), the CPU 11 attaches a tag indicating the type of the mark recognized in the picked-up image to the picked-up image (Step S5).

More specifically, the CPU 11 correlates and stores a tag (an idea, a decided matter, a thing to do, automatic submission, clipping or the like) corresponding to the mark recorded in the picked-up image with image data of the picked-up image in the picked-up image database 193.

Next, the CPU 11 determines whether or not the mark recognized in the picked-up image is a command mark (Step S6).

When determining that the recognized mark is not a command mark (Step S6; NO), namely, the recognized mark is a categorization-use mark, the CPU 11 cuts out a region relevant to the mark from the picked-up image (Step S7).

The region relevant to the mark may be a region enclosed by a line near the mark or a region sandwiched between blank rows near the mark.

Next, the CPU 11 adds the cut-out region to a list for the type of the mark (Step S8).

More specifically, the CPU 11 stores image data of the cut-out region in the category list 194*a*, 194*b*, 194*c* or . . . for the mark (the category list 194*a* if the mark is the "Idea" mark). Also, the CPU 11 correlates and stores information on the original image (the picked-up image of one page) of the cut-out region and coordinate data of the cut-out region with the image data of the cut-out region in the category list 194*a*, 194*b*, 194*c* or . . . .

When determining that the recognized mark is a command mark (Step S6; YES), the CPU 11 refers to the command mark correspondence table 192 stored in the storage unit 19 to read a command correlated with the mark (Step S9) and performs the read command on the picked-up image (Step S10).

After Step S8 or Step S10, the CPU 11 returns to Step S4 to repeat the step and the following steps.

When determining that all the marks recorded in the picked-up image are processed (Step S4; NO), the CPU 11 ends the mark recognition process.

Figure 9:
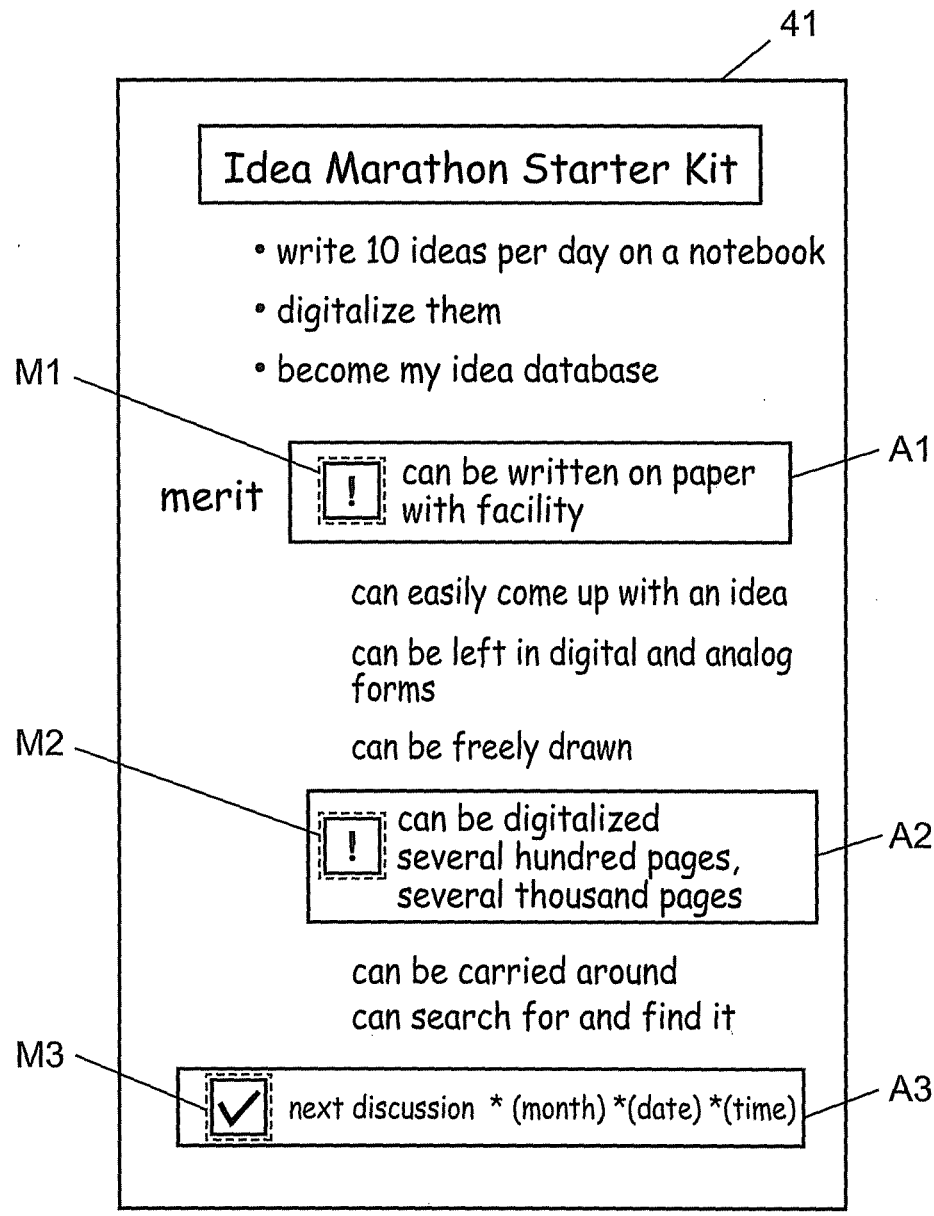
FIG. 9 is an example of a picked-up image obtained by photographing a recording medium on which handwritten characters and handwritten marks are recorded.

FIG. 9 shows an example of a picked-up image 41 obtained by photographing the recording medium 40 on which handwritten characters and handwritten marks are recorded.

A mark M1 in the picked-up image 41 is recorded to categorize a region A1 enclosed by a line as the "Idea".

A mark M2 in the picked-up image 41 is recorded to categorize a region A2 enclosed by a line as the "Idea".

A mark M3 in the picked-up image 41 is recorded to categorize a region A3 enclosed by a line as the "Decided Matter".

In the case of the example shown in FIG. 9, image data of the picked-up image 41 (of one page), tags "Idea" and "Thing to Do" and a generated date and time of the picked-up image 41 being correlated with each other are stored in the picked-up image database 193.

In the category list 194a, which is for the "Idea", image data of the region A1 is stored in the "Cut-out Region", information on the picked-up image 41 is stored in the "Original Image", and coordinate data of the region A1 in the picked-up image 41 is stored in the "Region Coordinate Data" in such a way that the information on the picked-up image 41 and the coordinate data of the region A1 are correlated with the image data of the region A1.

Similarly, in the category list 194a, which is for the "Idea", image data of the region A2 is stored in the "Cut-out Region", information on the picked-up image 41 is stored in the "Original Image", and coordinate data of the region A2 in the picked-up image 41 is stored in the "Region Coordinate Data" in such a way that the information on the picked-up image 41 and the coordinate data of the region A2 are correlated with the image data of the region A2.

In addition, in the category list 194b, which is for the "Decided Matter", image data of the region A3 is stored in the "Cut-out Region", information on the picked-up image 41 is stored in the "Original Image", and coordinate data of the region A3 in the picked-up image 41 is stored in the "Region Coordinate Data" in such a way that the information on the picked-up image 41 and the coordinate data of the region A3 are correlated with the image data of the region A3.

Figure 10:
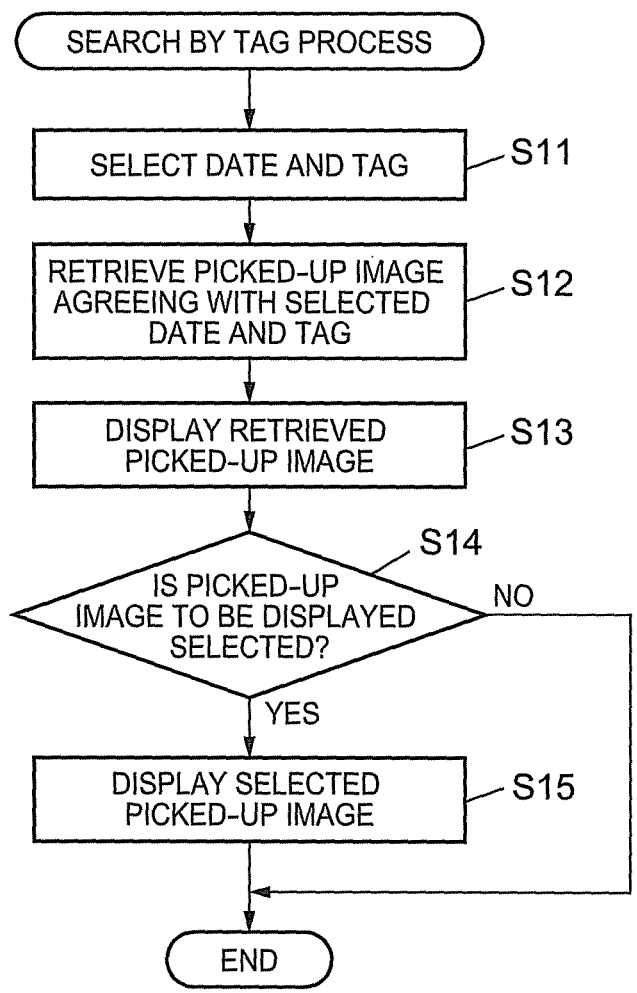
FIG. 10 is a flowchart of a search by tag process.

Next, a search by tag process performed by the information processing apparatus 1 is described with reference to FIG. 10.

The search by tag process is an example of processes to manage picked-up images tag by tag. The tags are attached to picked-up images at Step S5 of the mark recognition process.

First, a date and a tag to search for (search conditions) are selected through user operation on the touch panel 14b (Step S11).

Next, the CPU 11 retrieves image data of picked-up images agreeing with the selected date and tag on the basis of the "Generated Time and Date" and the "Tag" of the picked-up image database 193 stored in the storage unit 19 (Step S12).

Next, the CPU 11 displays the picked-up images agreeing with the search conditions on the display panel 14a on the basis of the retrieved image data of the picked-up images (Step S13).

Figure 11:
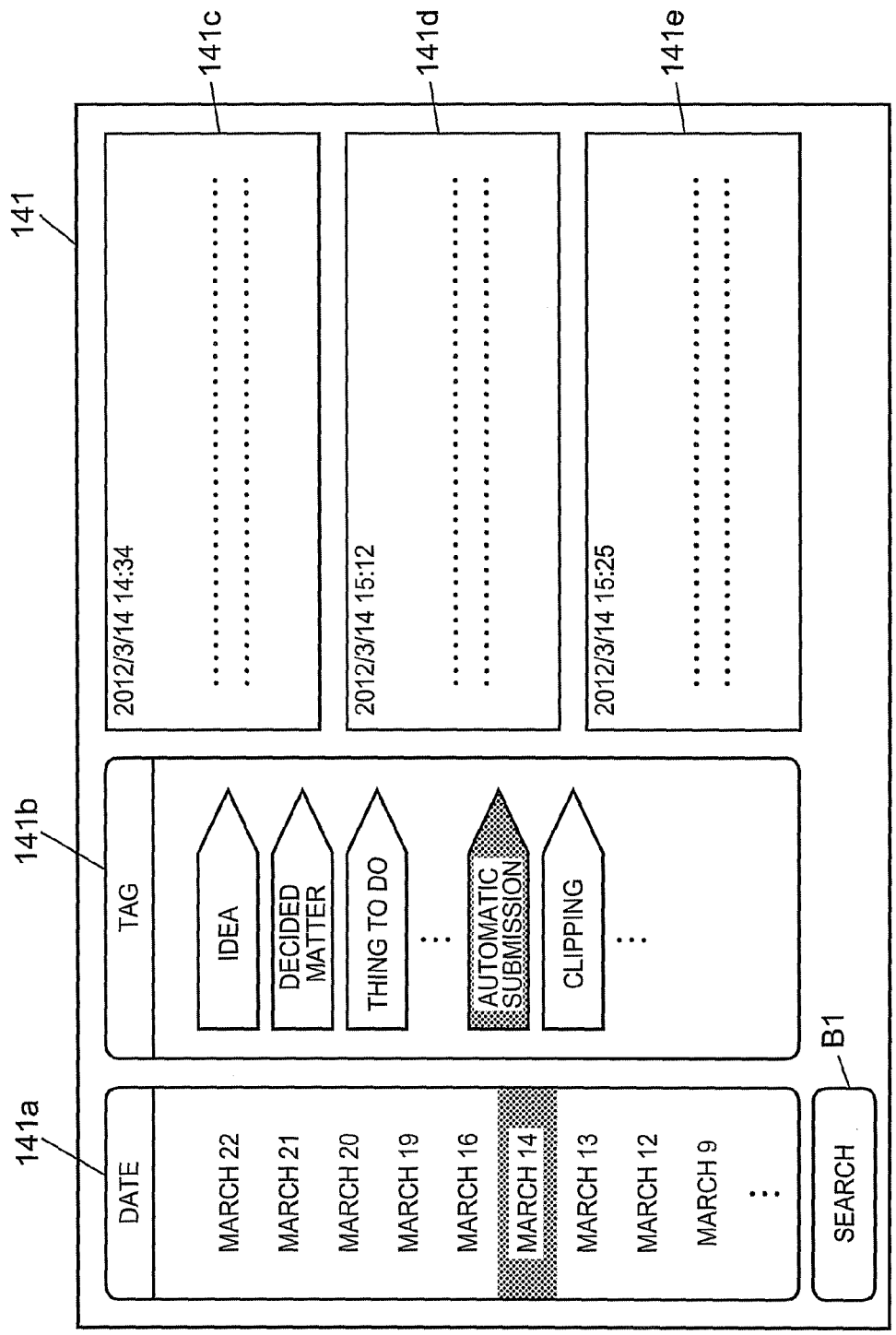
FIG. 11 shows an example of a search screen.

FIG. 11 shows an example of a search screen 141 displayed on the display panel 14a.

For example, when a search button B1 is pressed on the search screen 141 in a state in which a date (March 14) is selected in a date specification section 141a and a tag (Automatic Submission) is selected in a tag specification section 14b, picked-up images each having a generated date and time of "March 14" and a tag of "Automatic Submission" are retrieved from the picked-up image database 193, and the retrieved picked-up images are displayed in search result display sections 141c, 141d and 141e. In each of the search result display sections 141c, 141d and 141e, a part of the picked-up image such as the upper part thereof is displayed.

Next, the CPU 11 determines whether or not a picked-up image to be displayed is selected through user operation on the touch panel 14b (Step S14).

When determining that a picked-up image to be displayed is selected (Step S14; YES), the CPU 11 displays the selected picked-up image on the display panel 14a (Step S15).

For example, when, on the search screen 141 shown in FIG. 11, a picked-up image is selected from among (the parts of) the picked-up images displayed as search results in the search result display sections 141c, 141d and 141e, the whole page (one page) of the selected picked-up image is displayed.

On the other hand, when determining that a picked-up image to be displayed is not selected (Step S14; NO), the CPU 11 ends the search by tag process.

Figure 12:
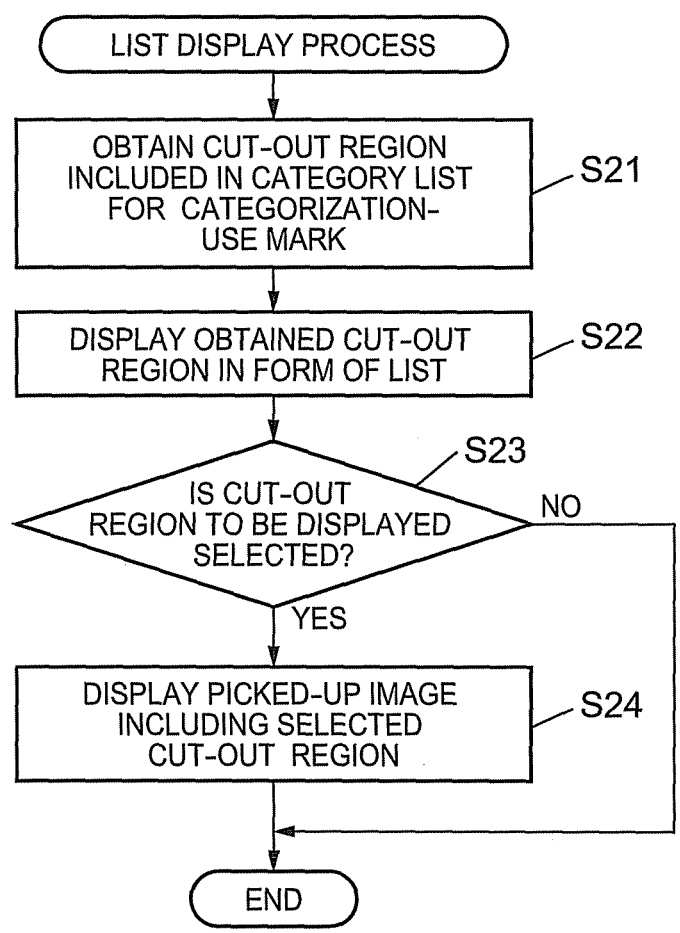
FIG. 12 is a flowchart of a list display process.

Next, a list display process performed by the information processing apparatus 1 is described with reference to FIG. 12.

The list display process is a process to list cut-out regions cut out from picked-up images mark by mark (type by type) on the basis of the category lists 194a, 194b, 194c, ... stored in the storage unit 19.

First, the CPU 11 obtains image data of cut-out regions included in the category list 194a, 194b, 194c or ... for a categorization-use mark (the "Idea" mark, the "Decided Matter" mark, the "Thing to Do" mark or the like) (Step S21).

For example, with respect to the "Idea" mark, the CPU 11 obtains image data of cut-out regions included in the category list 194a. The CPU 11 stores the obtained image data of the cut-out regions in the RAM 17.

Next, the CPU 11 displays a cut-out region list for the categorization-use mark on the display panel 14a on the basis of the obtained image data of the cut-out regions (Step S22).

Figure 13:
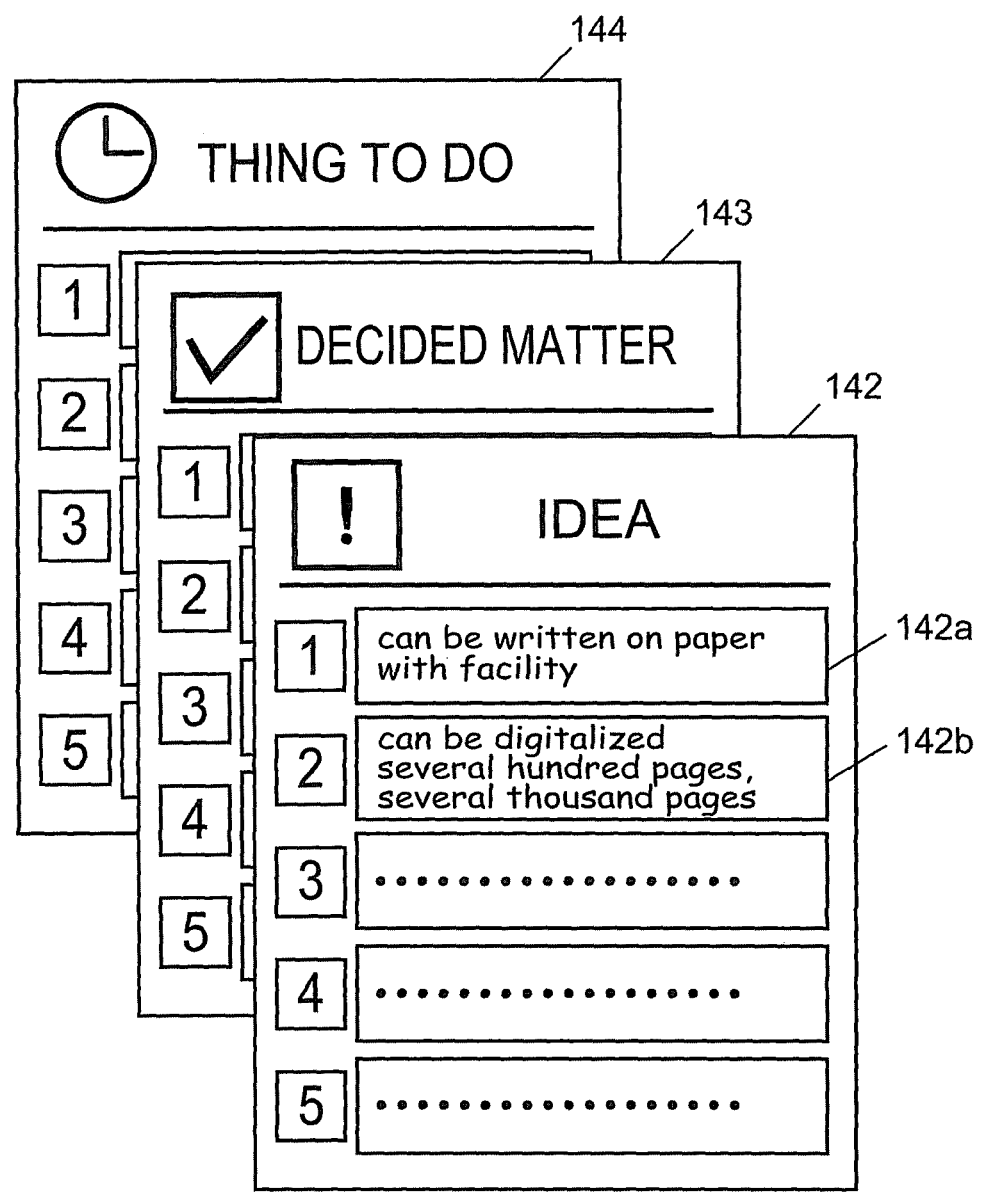
FIG. 13 shows examples of an idea list screen, a decided-matter list screen and a thing-to-do list screen.

FIG. 13 shows examples of an idea list screen 142, a decided-matter list screen 143 and a thing-to-do list screen 144 displayed on the display panel 14a.

The regions A1 and A2 cut out from the picked-up image 41 shown in FIG. 9 are displayed in list display sections 142a and 142b of the idea list screen 142, respectively.

In the example shown in FIG. 13, the regions A1 and A2 excluding the marks M1 and M2 which are included in the regions A1 and A2 shown in FIG. 9 are displayed. Instead, the regions A1 and A2 shown in FIG. 9, namely, the cut-out regions including the marks M1 and M2, may be displayed. Alternatively, the regions A1 and A2 excluding the marks M1 and M2 may be stored as the cut-out regions from the beginning.

Next, the CPU 11 determines whether or not a cut-out region to be displayed is selected through user operation on the touch panel 14b (Step S23).

When determining that a cut-out region to be displayed is selected (Step S23; YES), the CPU 11 displays a picked-up image including the selected cut-out region on the display panel 14a (Step S24).

More specifically, the CPU 11 refers to the "Original Image" of the category list 194a, 194b, 194c or ... correlated with the selected cut-out region, thereby identifying the picked-up image including the selected cut-out region.

Then, the CPU 11 reads image data of the identified picked-up image from the picked-up image database 193 stored in the storage unit 19 and displays the picked-up image on the display panel 14a on the basis of the read image data of the picked-up image.

For example, when, on the idea list screen 142 shown in FIG. 13, a cut-out region is selected from among the cut-out regions displayed in the list display sections 142a, 142b, ..., the whole page (one page) of the picked-up image, the page including the selected cut-out region, is displayed.

On the other hand, when determining that a cut-out region to be displayed is not selected (Step S23; NO), the CPU 11 ends the list display process.

Figure 14:
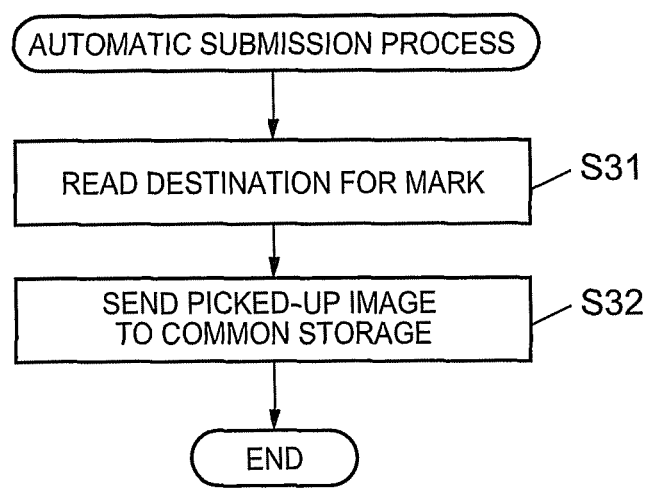
FIG. 14 is a flowchart of an automatic submission process.

Next, an automatic submission process performed by the information processing apparatus 1 is described with reference to FIG. 14. The automatic submission process is a process performed at Step S10 of the mark recognition process when the recognized mark is the command mark ("Automatic Submission" mark) indicating automatic submission.

First, the CPU 11 reads a destination for the "Automatic Submission" mark from the storage unit 19 (Step S31).

Next, the CPU 11 controls the wireless communication unit 16 so that a picked-up image generated by the image pickup unit 15 is sent to a predetermined common storage on the basis of the read destination (Step S32).

Then, the CPU 11 ends the automatic submission process.

The common storage stores therein and manages picked-up images sent from the information processing apparatus 1.

After the picked-up images are stored in the common storage, registered members of the common storage can see the picked-up images, which are automatically submitted.

Figure 15:
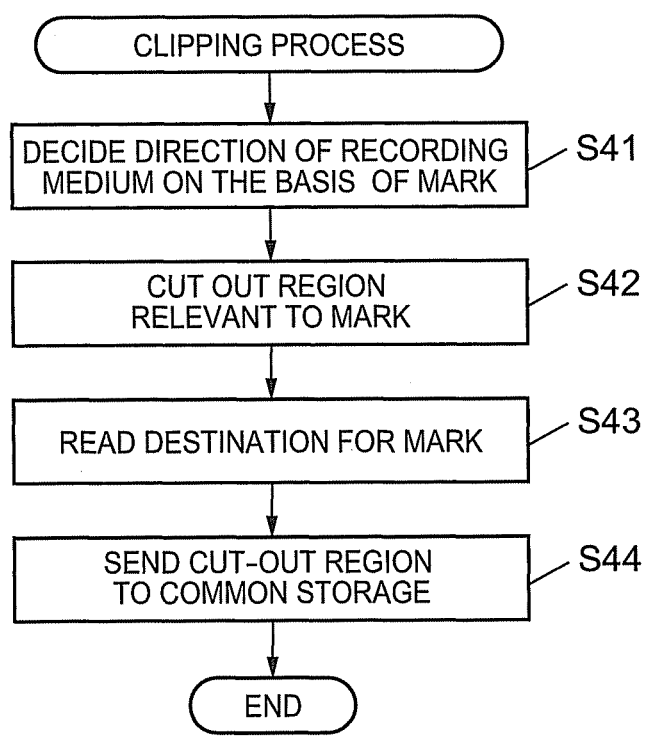
FIG. 15 is a flowchart of a clipping process.

Next, a clipping process performed by the information process apparatus 1 is described with reference to FIG. 15. The clipping process is a process performed at Step S10 of the mark recognition process when the recognized mark is the command mark ("Clipping" mark) indicating clipping.

First, the CPU 11 determines the direction of the recording medium 40 on the basis of the recognized "Clipping" mark (Step S41).

More specifically, the CPU 11 determines that the upper side of the "Clipping" mark shown in the command mark correspondence table 192 of FIG. 5 corresponds to the upper side of the recording medium 40.

Next, the CPU 11 cuts out a region relevant to the mark, namely, a region enclosed by a line near the mark, from the picked-up image (Step S42).

Next, the CPU 11 reads a destination for the "Clipping" mark from the storage unit 19 (Step S43).

Next, the CPU 11 controls the wireless communication unit 16 so that the cut-out region cut out at Step S42 is sent to a predetermined common storage on the basis of the read destination (Step S44)

Then, the CPU 11 ends the clipping process.

Figure 16:
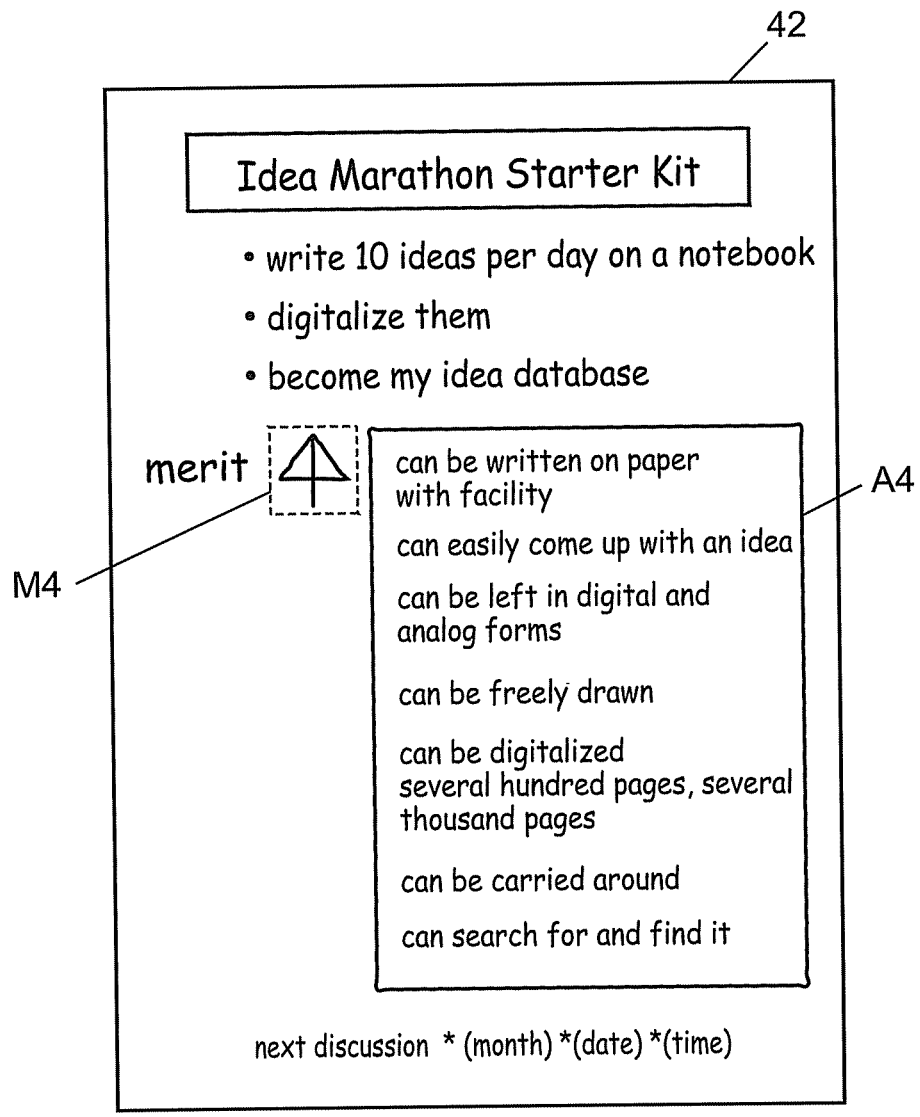
FIG. 16 shows an example of a picked-up image obtained by photographing a recording medium on which a "Clipping" mark is recorded.

FIG. 16 shows an example of a picked-up image 42 obtained by photographing the recording medium 40 on which the command mark ("Clipping" mark) indicating clipping is recorded.

A mark M4 in the picked-up image 42 is recorded to clip (cut out) a region A4 enclosed by a line.

Image data of the region A4 cut out from the picked-up image 42 is sent to the predetermined common storage.

The common storage stores therein and manages cut-out regions sent from the information processing apparatus 1.

After the cut-out regions are stored in the common storage, registered members of the common storage can see the cut-out regions.

The "Clipping" mark may be printed on the recording medium 40 in advance instead of being handwritten thereon.

As described above, according to the information processing apparatus 1 of the first embodiment, a predetermined process is performed in accordance with a mark recognized in a picked-up image. Accordingly, the contents (note) recoded on the recording medium 40 can be effectively used.

Further, the whole area of a picked-up image is searched for a predetermined mark. Accordingly, a user can record a mark anywhere on the recording medium 40.

Further, a tag indicating the type of a mark recognized in a picked-up image is attached to the picked-up image. Accordingly, management of picked-up images can be easy; for example, search for a picked-up image can be performed by using a tag.

Further, when a mark recognized in a picked-up image is a categorization-use mark, a region relevant to the recognized mark can be cut out from the picked-up image, and the cut-out region is categorized based on the type of the mark so as to be stored in the category list 194a, 194b, 194c or . . . stored in the storage unit 19. Accordingly, the contents (note) recorded on the recording medium 40 can be automatically categorized. Consequently, retrieval of cut-out regions mark by mark (type by type) and search for a cut-out region by using a mark (type) can be easy.

Further, cut-out regions are listed mark by mark (type by type) and displayed on the display panel 14a as lists. Accordingly, the contents (note) recorded on the recording medium 40 can be easily checked mark by mark (type by type).

Further, when a mark recognized in a picked-up image is a command mark, a command correlated with the mark is performed on the picked-up image. Accordingly, a process according to a command can be easily performed on a picked-up image without user's direct instruction.

For example, on the basis of the "Automatic Submission" mark, a picked-up image is sent to a predetermined common storage. Accordingly, user's effort, such as giving an instruction on a submission process or specifying a destination, is unnecessary.

Also, on the basis of the "Clipping" mark, a region enclosed by a line is cut out from a picked-up image, and the cut-out region is sent to a predetermined common storage. Accordingly, user's effort, such as giving an instruction on a clipping process or specifying a destination, is unnecessary.

Further, the recording medium 40 is photographed at the timing when the binder 30, which includes the first cover 30a and the second cover 30b, being closed to a determined state is detected. Accordingly, the recording medium 40 can be easily photographed.

The detection method of the open-close angle formed by the first cover 30a and the second cover 30b is not limited to the above described method.

For example, it is possible to attach a symbol to a predetermined point on the first cover 30a and detect that the binder 30, which includes the first cover 30a and the second cover 30b, is closed to a predetermined state on the basis of the position of the symbol in an image taken by the image pickup unit 15.

Alternatively, it is possible to provide the second cover 30b with an acceleration sensor inside and detect the direction of gravity with the acceleration sensor to detect the open-close angle formed by the first cover 30a and the second cover 30b.

[Second Embodiment]

Next, a second embodiment to which the present invention is applied is described.

Figure 17A:
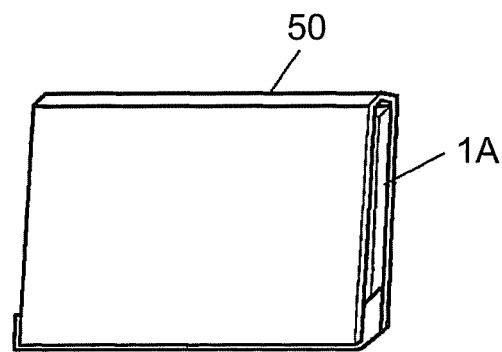
FIG. 17A shows a state in which an information processing apparatus in accordance with a second embodiment of the present invention is housed in a body cover.
Figure 17B:
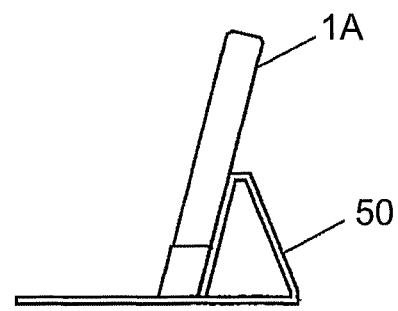
FIG. 17B is a lateral view showing a state in which the information processing apparatus stands against the body cover.
Figure 17C:
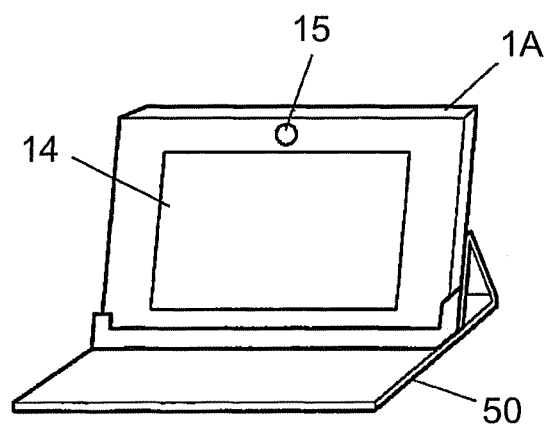
FIG. 17C is a perspective view showing a state in which the information processing apparatus stands against the body cover.

FIG. 17A shows a state in which an information processing apparatus 1A in accordance with the second embodiment is housed in a body cover 50. FIGS. 17B and 17C each show a state in which the information processing apparatus 1A stands against the body cover 50.

The components of the information processing apparatus 1A same as those of the information processing apparatus 1 of the first embodiment are denoted by the reference numbers same as those in the first embodiment, and description thereof is omitted.

Figure 18:
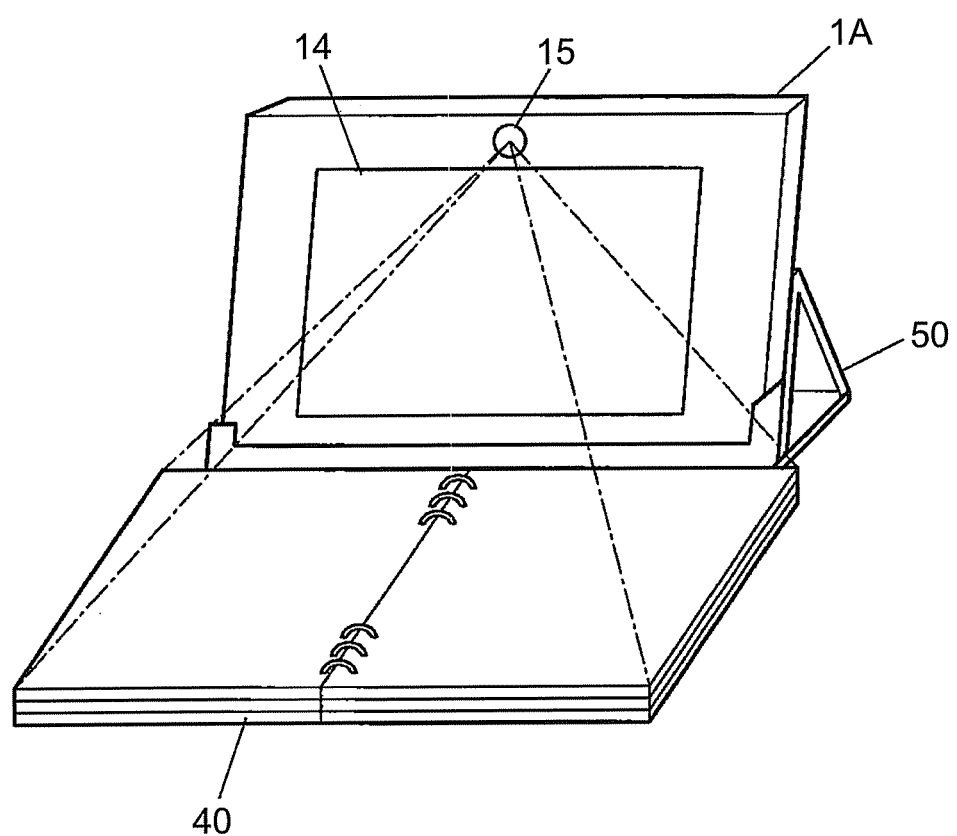
FIG. 18 shows a state in which a recording medium is placed in front of the information processing apparatus.

FIG. 18 shows a state in which the information processing apparatus 1A stands against the body cover 50, and the recording medium 40 is placed in front of the information processing apparatus 1A.

In the second embodiment, the recording medium 40 is composed of a plurality of pages in a form of a book, and the recording medium 40 is photographed by the image pickup unit 15 at timings when pages of the recording medium 40 are turned (page-turning operation).

The angle of view and the focus of the image pickup unit 15 are preset to be suitable for the recording medium 40 placed in such away that the upper end of the recording medium 40 and the lower end of the information processing apparatus 1A are lined up.

The information processing apparatus 1A is the same as the information processing apparatus 1 of the first embodiment except for the information processing apparatus 1A not requiring the open-close angle sensor 20 and the binder 30. Hence, description of the components same as those of the information processing apparatus 1 is omitted by citing FIG. 3. In the following, the components, operations and the like characteristic of the second embodiment are described.

The CPU 11 takes in video image data obtained by the image pickup unit 15 continuously photographing (shooting) the recording medium 40 and analyzes the video image data to detect the page-turning operation by which pages of the recording medium 40 are turned.

It is assumed that the image data outputted from the image pickup unit 15 varying means that a page of the recording medium 40 is being turned to another page (the next page) thereof or user's finger is moving, namely, the page-turning operation is being performed. The CPU 11 keeps taking in the video image data obtained by the image pickup unit 15 continuously photographing the recording medium 40 and, when the image data does not vary, determines that the page-turning operation has been performed (completed).

The CPU 11 makes the image pickup unit 15 photograph the recording medium 40 to obtain image data of an image (still image) at the timing when detecting (completion of) the page-turning operation on the recording medium 40.

The mark recognition process performed by the information processing apparatus 1A is the same as that performed by the information processing apparatus 1 of the first embodiment except for the timing when the recording medium 40 is photographed. Hence, description of the same steps is omitted by citing FIG. 8.

In the second embodiment, the CPU 11 determines whether or not (completion of) the page-turning operation on handwritten notes (the recording medium 40) is detected on the basis of the video image data continuously taken in from the image pickup unit 15 (Step S1).

When determining that the page-turning operation is detected (Step S1; YES), the CPU 11 controls the image pickup unit 15 so that a handwritten note recorded on the recording medium 40 is photographed and obtains a note image (still image/picked-up image) generated by the image pickup unit 15 (Step S2).

Step S3 and the following steps in the second embodiment are the same as those in the first embodiment, and hence description thereof is omitted.

Also, the search by tag process (see FIG. 10), the list display process (see FIG. 12), the automatic submission process (see FIG. 14) and the clipping process (see FIG. 15) of the second embodiment are the same as those of the first embodiment, and hence description thereof is omitted.

As described above, according to the information processing apparatus 1A of the second embodiment, the recording medium 40 is photographed at the timing when the page-turning operation is detected. Accordingly, in addition to the effects obtained by the first embodiment, the recording medium 40 can be easily photographed.

The detection method of the page-turning operation is not limited to the above described method. For example, it is possible to attach a page-identification-use mark for identifying a page to a predetermined point on each page of the recording medium 40 and determine that the page-turning operation is detected when the page-identification-use mark is detected from a predetermined point in an image taken in from the image pickup unit 15.

The embodiments described above (and below) are examples of an information processing apparatus of the present invention. Hence, the present invention is not limited to the embodiments. In addition, various modifications can be made regarding the detailed configurations and operations of the components constituting the information processing apparatus without departing from the scope of the present invention.

For example, the marks recorded on the recording medium 40 are not limited to the above described examples. Another categorization-use mark can be added to the categorization-use mark correspondence table 191 with its category. Also, another command mark can be added to the command mark correspondence table 192 with its command.

Further, in each of the automatic submission process (see FIG. 14) and the clipping process (see FIG. 15) of the embodiments, a destination (common storage) for the mark is read from the storage unit 19, and picked-up images or cut-out regions are automatically sent to the preset destination. Alternatively, it is possible that a setting screen to set a destination is displayed before picked-up images or cut-out regions are sent, and a user selects a destination thereon.

In the above, a ROM is used as a computer readable medium where the programs to perform the processes are stored. However, this is not a limitation but an example. As another computer readable medium, a nonvolatile memory such as a flash memory or a portable medium such as a CD-ROM can be used. Further, as a medium to provide data of the programs via a communication line, a carrier wave can be used.

[Third Embodiment]

Next, a third embodiment to which the present invention is applied is described.

In the third embodiment, in the storage unit 19 shown in FIG. 3, a scheduler program, an OCR (Optical Character Recognition) program, an image management program and a mail program are stored.

The scheduler program is a program to manage schedules (time, events etc.) and to input, edit and display events, start times and end times thereof, attendees thereof and the like.

Information including contents of an event, a date and time of the event, attendees of the event and the like as a schedule is referred to as event information.

The CPU 11, the scheduler program and the storage unit 19 function as a scheduler (management unit).

The OCR program is a program to perform a recognition process by performing an image process on input image to generate binarized image data, collate the image data with pre-stored patterns to identify characters (letters, symbols and the like) and output character data.

The CPU 11 and the OCR program function as a recognition unit to recognize identification information existing in the area of a picked-up image picked up by the image pickup unit 15.

The image management program is a program, for example, to display and manage image data of note images (picked-up images) picked up by the image pickup unit 15.

The CPU 11 and the image management program function as an image editing unit to generate sending images (image data thereof), for example, by cutting out regions from images.

The mail program is a program to send note images picked up by the image pickup unit 15 by email.

The CPU 11 and the mail program function as a mailing unit.

Figure 19:
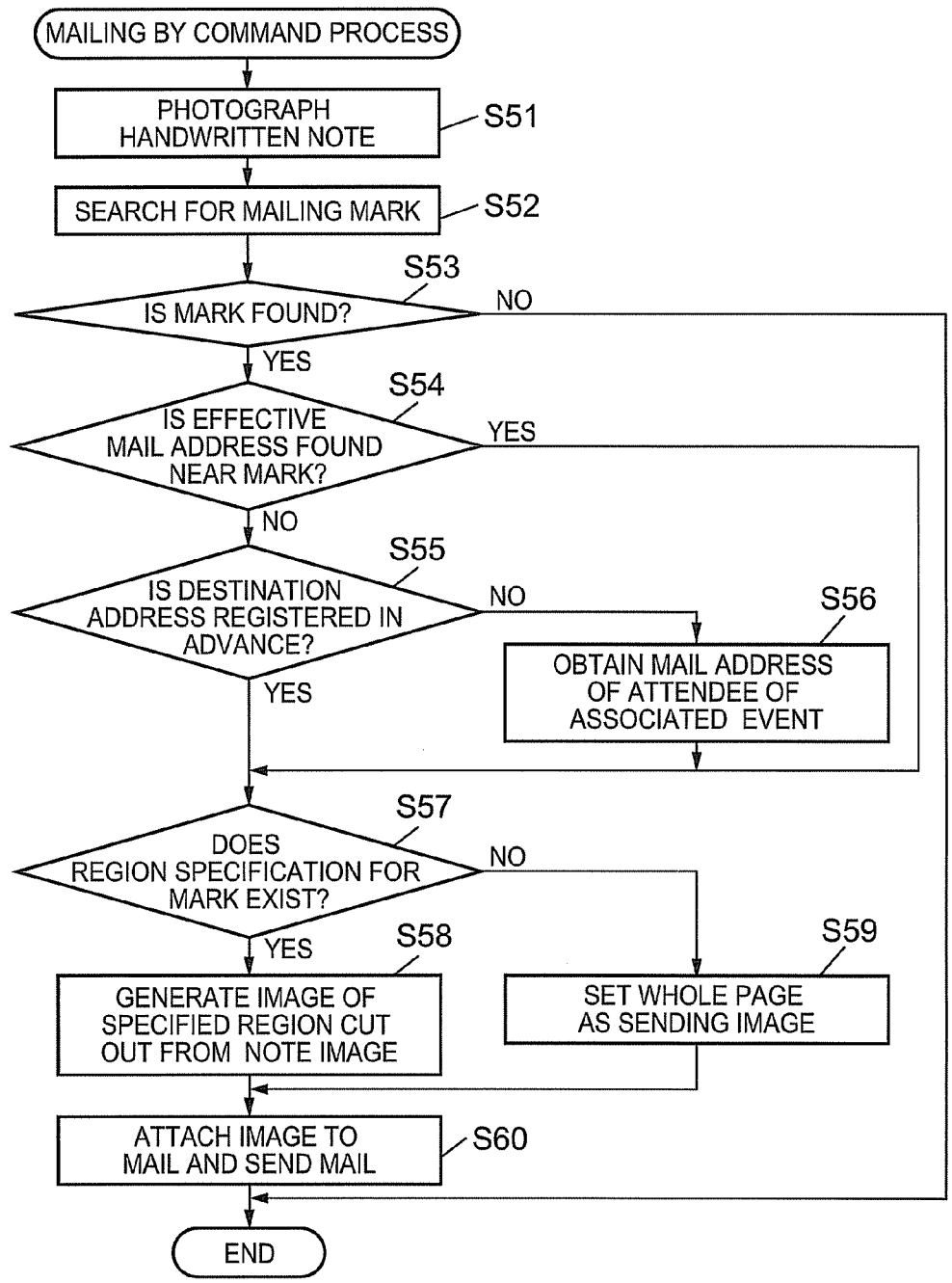
FIG. 19 is a flowchart of a mailing by command process performed by an information processing apparatus in accordance with a third embodiment of the present invention.

FIG. 19 is a flowchart of a mailing by command process performed by an information processing apparatus 1 of the third embodiment.

In the following, the mailing by command process is described with reference to FIG. 19. This process is performed by the CPU 11 working in coordination with the programs stored in the storage unit 19.

As a prerequisite for the mailing by command process, for example, a handwritten note is recorded on the recording medium 40 shown in FIG. 1, and then the binder 30 of the information processing apparatus 1 is to be closed in a state in which the information processing apparatus 1 is in operation. In the mailing by command process, as an optimum angle for photographing the recording medium 40 (optimum angle for photography), the open-close angle is set to 70°.

More specifically, when the open-close angle sensor 20 detects an angle of 70° (optimum angle for photography) as an angle formed by the first cover 30a and the second cover 30b, the CPU 11 obtains a note image generated by the image pickup unit 15. The photography conditions of a focus, an exposure and the like are set to be suitable for the optimum angle for photography (70°, for example).

When the mailing by command process starts, and the open-close angle sensor 20 detects an angle of about 70° (optimum angle for photography) as an angle formed by the first cover 30a and the second cover 30b, the CPU 11 controls the image pickup unit 15 so that a handwritten note is photographed (Step S51).

That is, at Step S51, the CPU 11 controls the image pickup unit 15 so that a handwritten note recorded on the recording medium 40 is photographed while the binder 30 is being closed, namely, at the timing when the binder 30 is closed to a predetermined state, and stores a note image picked up by the image pickup unit 15 in the RAM 17.

Then, the CPU 11 controls the OCR program to search the area of the note image for a command mark ("Mailing" mark) indicating mailing (Step S52). The "Mailing" mark is used as the identification information.

Figure 20A:
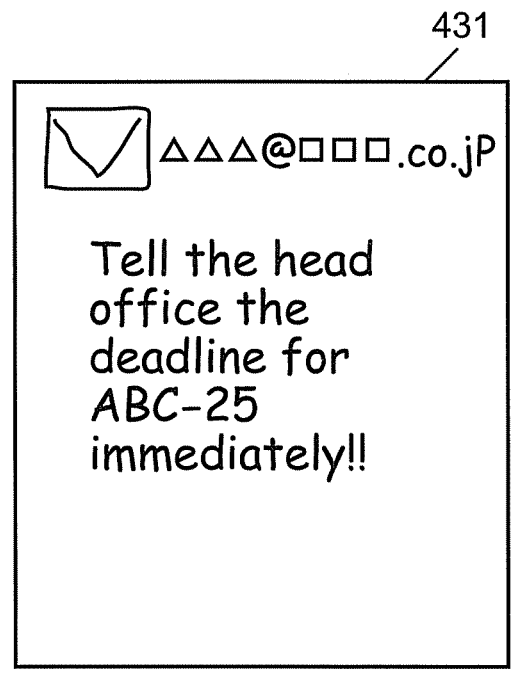
Figure 20B:
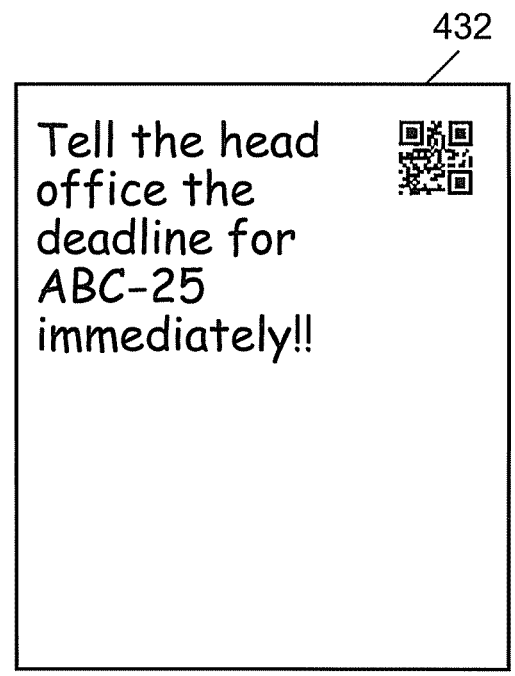

FIGS. 20A and 20B each show an example of a handwritten note with the "Mailing" mark.

FIG. 20A is an example of a handwritten note including a handwritten "Mailing" mark in the shape of "V" in a rectangle recorded on a recording medium 431.

FIG. 20B is an example of a handwritten note recorded on a recording medium 432 on which a two-dimensional barcode "Mailing" mark is printed.

In FIG. 20A, a mail address (email address/destination address) is handwritten near the mark. Alternatively, a destination address may be registered to the mark in advance through the mail program.

To the mark, one destination address or a plurality of destination addresses may be assigned.

As shown in FIG. 20B, the two-dimensional barcode ("Mailing" mark) may be pre-printed on a recording medium. A handwritten note is recorded in a space of the recording medium on which the two-dimensional barcode is printed.

FIG. 21 shows a correspondence between kinds of the "Mailing" mark and destination addresses which are registered in advance through the mail program. As shown in FIG. 21, it is possible that a plurality of kinds of the "Mailing" mark is prepared, and a user uses a desired kind thereof.

For example, three kinds of the "Mailing" mark are prepared.

The first kind thereof is a rectangle with V1 inside, and a mail address of Mr. A is assigned to the mark as a destination address.

The second kind thereof is a rectangle with V2 inside, and a mail address of Mr. B is assigned to the mark as a destination address.

The third kind thereof is a rectangle with V3 inside, and a mail address of Mr. C is assigned to the mark as a destination address.

Alternatively, it is possible that no destination is assigned to any of the kinds of the mark in the initial state, and a destination (or destinations) is assigned to each of the kinds thereof through a setting operation.

Here, FIG. 19 is referred to again. The CPU 11 determines whether or not the "Mailing" mark is found (Step S53). When determining that the "Mailing" mark is found (Step S53; YES), the CPU 11 proceeds to Step S54. On the other hand, when determining that the "Mailing" mark is not found (Step S53; NO), the CPU 11 ends the mailing by command process.

At Step S54, the CPU 11 determines whether or not an effective mail address exists near the "Mailing" mark (Step S54).

When determining that an effective mail address exists near the "Mailing" mark (Step S54; YES), the CPU 11 proceeds to Step S57. On the other hand, when determining that an effective mail address does not exist near the "Mailing" mark (Step S54; NO), the CPU 11 proceeds to Step S55.

At Step S55, the CPU 11 determines whether or not a destination address is registered in advance as shown in FIG. 21 (Step S55). That is, the CPU 11 checks whether or not a destination address is assigned to the "Mailing" mark in advance. When determining that a destination address is registered (Step S55; YES), the CPU 11 proceeds to Step S57. On the other hand, when determining that a destination address is not registered (Step S55; NO), the CPU 11 proceeds to Step S56.

At Step S56, the CPU 11 obtains a mail address of an attendee (or addresses of attendees) of an associated event (Step S56). More specifically, first, the CPU 11 obtains a current date and time from the timer unit 21. The current date and time is a date and time when the CPU 11 takes Step S56 and a date and time when a handwritten note is substantially photographed so that a note image is obtained.

Next, the CPU 11 controls the scheduler to search for and retrieve the event associated (associated event) with the current date and time when the handwritten note is substantially photographed.

Figure 22A:
Figure 22B:

FIGS. 22A and 22B each show a scheduler display screen displayed by the CPU 11 and the scheduler program. FIG. 22A shows a calendar display 411, and FIG. 22B shows an event (schedule) display 412. On the calendar display 411 shown in FIG. 22A, a photography icon 51 and a registration icon 52 are displayed. The registration icon 52 is displayed on the event display 412 shown in FIG. 22B too.

A user uses the registration icon 52 to register each individual event from the scheduler display screen shown in FIGS. 22A and 22B.

FIG. 23 shows the data structure stored in the storage unit 19 which functions as a second storage unit in the scheduler as the management unit. With respect to each event, an ID, an event name, a date and time (a start date and time and an end date and time), an attendee (or attendees) and a mail address (destination address) of the attendee are registered.

As shown in FIG. 23, the data structure in which a mail address of each attendee or the like is included in the event information can be adopted. Alternatively, it is possible, in the scheduler, to register a mail address (or addresses), for example, as a separate address notebook in the second storage unit and correlate the mail address with the attendee included in the event information.

The associated event is an event having a registered event period (defined by the start time and the end time of the event) in which the current date and time is included.

However, for example, an event such as a meeting may continue after its scheduled end time or start a little before its scheduled start time. By such situations taken into account, an event can be accepted as the associated event even if the current date and time or the date and time recorded in a note image is somewhat before or after the registered event period of the event. For example, if there is an event having a registered event period the end time of which is a little earlier than the current date and time or the date and time recorded in a note image, the event is determined as the associated event.

Here, FIG. 19 is referred to again. When retrieving the associated event, the CPU 11 correlates and stores image data of the note image with the event information in the storage unit 19 which functions as a first storage unit.

Then, the CPU 11 obtains the mail address of the attendee (or addresses of the attendees) registered to the event.

At Step S57, the CPU 11 determines whether or not a region specification for the "Mailing" mark exists (Step S57). When determining that a region specification for the "Mailing" mark exists (Step S57; YES), the CPU 11 proceeds to Step S58. On the other hand, when determining that a region specification for the "Mailing" mark does not exist (Step S57; NO), the CPU 11 proceeds to Step S59.

At Step S58, the CPU 11 controls the image management program to generate an image of the specified region (cut-out region) cut out from the note image (Step S58).

When detecting that a plurality of region specifications for the "Mailing" mark exists at Step S57, the CPU 11 controls the image management program to generate a plurality of images of the specified regions (cut-out regions) cut out from the note image.

FIG. 24 is an illustration for explaining region specifications for the "Mailing" mark.

In the case of FIG. 24, the CPU 11 recognizes regions enclosed by respective lines in the whole area of the note image 433 as regions specified by the region specifications (i.e., lines) for the "Mailing" mark.

The line is, for example, a solid line. It is necessary to impose some restrictions on a region specification so that an error in its recognition can be prevented. That is, the line (region specification) should not overlap with handwritten characters. In addition, the line should be a substantially closed line.

At Step S59, the CPU 11 sets the entire note image (whole page) as an image to be sent (sending image) (Step S59).

At Step S60, the CPU 11 attaches the image specified at Step S58 or Step S59 as a sending image to a mail and sends the mail to a predetermined destination address (Step S60). The destination address is the mail address specified at Step S53, S55 or S56.

[Modification]

Next, an information processing apparatus 1A in accordance with a modification of the third embodiment is described by citing FIG. 18.

FIG. 18 shows a state in which the information processing apparatus 1A of the modification stands against the body cover 50, and the recording medium 40 is placed in front of the information processing apparatus 1A.

In the modification, the recording medium 40 is composed of a plurality of pages in a form of a book, and handwritten notes of the recording medium 40 are photographed by the image pickup unit 15 at timings when pages of the recording medium 40 are turned (page-turning operation).

The angle of view and the focus of the image pickup unit 15 are preset to be suitable for the recording medium 40 placed in such a way that the upper end of the recording medium 40 and the lower end of the information processing apparatus 1A are lined up.

The information processing apparatus 1A is the same as the information processing apparatus 1 of the third embodiment except for the information processing apparatus 1A not requiring the open-close angle sensor 20 and the binder 30. Hence, description of the components same as those of the information processing apparatus 1 is omitted by citing FIG. 3. In the following, the components, operations and the like characteristic of the modification are described.

In the information processing apparatus 1A of the modification, the CPU 11 makes the image pickup unit 15 photograph the pages of the recording medium 40 to obtain note images (picked-up images), whereby photographing the recording medium 40 is completed. Then, the CPU 11 sends a mail including the note images to a predetermined destination address corresponding to the "Mailing" mark recorded on the first page of the recording medium 40.

The "Mailing" mark may be recorded on any page of the recording medium 40 such as a page in the middle or the last page of the recording medium 40.

Next, photographing handwritten notes is described. When an instruction to start an image pickup mode is inputted through user operation on the touch panel 14b, first, the CPU 11 takes in video image data obtained by the image pickup unit 15 continuously photographing (shooting) the recording medium 40 and analyzes the video image data to detect the page-turning operation by which pages of the recording medium 40 are turned. It is assumed that the image data outputted from the image pickup unit 15 varying means that a page of the recording medium 40 is being turned to another page (the next page) thereof or user's finger is moving, namely, the page-turning operation is being performed.

The CPU 11 keeps taking in the video image data obtained by the image pickup unit 15 continuously photographing the recording medium 40 and, when the image data does not vary, determines that the page-turning operation has been performed (completed). The CPU 11 makes the image pickup unit 15 photograph the recording medium 40 to obtain image data of an image (still image) at the timing when detecting the page-turning operation on the recording medium 40.

The CPU 11 controls the image pickup unit 15 so that the handwritten note recorded on the recording medium 40 is photographed and stores the note image (still image) generated by the image pickup unit 15 in the RAM 17.

Next, the CPU 11 determines whether or not an instruction to end the image pickup mode is inputted through user operation on the touch panel 14*b*.

When determining that an instruction to end the image pickup mode is not inputted, the CPU 11 continues to detect the page-turning operation, and when detecting the page-turning operation, controls the image pickup unit 15 so that the handwritten note recorded on the recording medium 40 is photographed and stores the note image generated by the image pickup unit 15 in the RAM 17.

On the other hand, when determining that an instruction to end the image pickup mode is inputted, the CPU 11 stops photographing the recording medium 40.

The method for obtaining a destination address in the modification is the same as that in the third embodiment.

The "Mailing" mark may be in a form of a two-dimensional barcode, and the recording medium 40 may be composed of a plurality of pages on each of which the two-dimensional barcode is printed. In such a case, for example, an instruction on a destination may be registered in a similar manner to that shown in FIG. 21 with page numbers; for example, "this page is the first page, this page is the second page, this page is the third page, and this page is the last page, and hence this last page should be sent to this destination with the first to third pages". When photographing the recording medium 40 is completed, the pages can be sent to the predetermined destination.

As described above, the information processing apparatus 1 of the third embodiment includes: the image pickup unit which photographs the recording medium 40 to obtain image data of a handwritten note recorded on the recording medium 40; the recognition unit which recognizes the identification information (the "Mailing" mark) existing in the area of an image based on the image data obtained by the image pickup unit; and the mailing unit which sends a mail including the obtained image data to a destination corresponding to an instruction content of the identification information recognized by the recognition unit. Accordingly, image data obtained by photographing the recording medium 40 can be easily sent to a predetermined destination.

The information processing apparatus 1 of the third embodiment further includes: the binder 30 as a case including (i) the first cover 30*a* as the first case on which the recording medium 40 is disposed and (ii) the second cover 30*b* as the second case provided with the body unit 10 and connected with the first cover 30*a* through the hinge part 30*c* so that the binder 30 is closable; and the open-close angle sensor 20 which detects that the binder 30 is closed to a predetermined state. The image pickup unit 15 is disposed at a point of the body unit 10 so as to face the first cover 30*a* and obtains the image data at the timing when the open-close angle sensor 20 detects that the binder 30 is closed to the predetermined state.

Accordingly, a handwritten note can be photographed at the timing when the binder 30 (case) is being closed, and the image data thereof can be automatically sent by email.

What is claimed is:

1. An information processing apparatus comprising:
    an image pickup unit which photographs a recording medium to generate a picked-up image;
    a recognition unit which recognizes a predetermined mark in the picked-up image generated by the image pickup unit; and
    a sending control unit which sends the picked-up image to a predetermined destination when the recognition unit recognizes the predetermined mark in the picked-up image,
    wherein the sending control unit cuts out a region from the picked-up image, the region corresponding to a region enclosed by a line recorded on the recording medium, and sends the cut-out region to the predetermined destination.

2. The information processing apparatus according to claim 1, further comprising:
    a case including:
        a first case on which the recording medium is disposed; and
        a second case provided with a body unit and connected with the first case through a hinge part so that the case is closeable; and
    a detection unit which detects that the case is closed to a predetermined state, wherein
    the image pickup unit is disposed at a point of the body unit so as to face the first case, and
    the information processing apparatus further comprises a photography control unit which makes the image pickup unit photograph the recording medium at a timing when the detection unit detects that the case is closed to the predetermined state.

3. The information processing apparatus according to claim 1, wherein the sending control unit reads the destination for the predetermined mark and sends the picked-up image to the read destination.

4. A non-transitory computer readable medium in which a program to make a computer perform a procedure is stored, the procedure comprising:
    recognizing a predetermined mark in a picked-up image generated by an image pickup unit photographing a recording medium; and
    sending the picked-up image to a predetermined destination when recognizing the predetermined mark in the picked-up image,
    wherein the sending control unit cuts out a region from the picked-up image, the region corresponding to a region enclosed by a line recorded on the recording medium, and sends the cut-out region to the predetermined destination.

5. An information processing apparatus comprising:
    an image pickup unit which photographs a recording medium to obtain image data;
    an image recognition unit which determines whether or not a mark indicating mailing is in the obtained image data; and
    a mailing unit which sends a mail including the obtained image data to a predetermined destination address for the mark when the image recognition unit determines that the mark is in the obtained image data, wherein
    a plurality of kinds of the mark is prepared, and the destination address is registered in advance for each of the kinds of the mark, and
    the mailing unit sends the mail to the destination address registered in advance for each of the kinds of the mark.

6. The information processing apparatus according to claim 5, further comprising:
    a case including:
        a first case on which the recording medium is disposed; and
        a second case provided with a body unit and connected with the first case through a hinge part so that the case is closeable; and a detection unit which detects that the case is closed to a predetermined state, wherein
the image pickup unit is disposed at a point of the body unit so as to face the first case and obtains the image data at a timing when the detection unit detects that the case is closed to the predetermined state.

7. The information processing apparatus according to claim 5, further comprising:
a management unit which performs schedule management by registering event information including an associated date and time which is associated with an event;
a first storage unit in which the image data and the event information being correlated with each other are stored; and
a second storage unit in which the event information and a destination address being correlated with each other are stored, wherein
the mailing unit sends the mail to the destination address correlated with the event information correlated with the image data.

8. An information processing apparatus comprising:
an image pickup unit which photographs a recording medium to obtain image data;
an image recognition unit which determines whether or not a mark indicating mailing is in the obtained image data; and
a mailing unit which sends a mail including the obtained image data to a predetermined destination address for the mark when the image recognition unit determines that the mark is in the obtained image data, wherein
when determining that the mark is in the image data, the image recognition unit recognizes a region substantially enclosed by a line in the image data,
the information processing apparatus further comprises an image editing unit which cuts out the substantially enclosed region from the image data to generate sending image data, and
the mailing unit sends the mail including the sending image data generated by the image editing unit to the destination address.

9. The information processing apparatus according to claim 8, wherein when the image recognition unit determines that a plurality of kinds of the mark is in the image data, with respect to each of the kinds of the mark,
the image recognition unit recognizes the region substantially enclosed by the line in the image data, and
the image editing unit cuts out the substantially enclosed region from the image data to generate the sending image data.

10. A non-transitory computer readable medium in which a program to make a computer perform a procedure is stored, the procedure comprising:
photographing a recording medium to obtain image data;
determining whether or not a mark indicating mailing is in the obtained image data; and
sending a mail including the obtained image data to a predetermined destination address for the mark when determining that the mark is in the obtained image data, wherein
a plurality of kinds of the mark is prepared, and the destination address is registered in advance for each of the kinds of the mark, and
the mailing unit sends the mail to the destination address registered in advance for each of the kinds of the mark.

* * * * *